(12) United States Patent
Merz et al.

(10) Patent No.: US 11,379,871 B2
(45) Date of Patent: Jul. 5, 2022

(54) METHOD, APPARATUS, AND COMPUTER PROGRAM PRODUCT FOR PROVIDING REAL TIME INCENTIVES

(71) Applicant: Groupon, Inc., Chicago, IL (US)

(72) Inventors: Michael Merz, Bellevue, WA (US); Kevin Jungmeisteris, Bellevue, WA (US); Brandon Arp, Seattle, WA (US); Selvam Velmurugan, Issaquah, WA (US); Abhishek Prasad, Sammamish, WA (US)

(73) Assignee: GROUPON, INC., Chicago, IL (US)

(*) Notice: Subject to any disclaimer, the term of this patent is extended or adjusted under 35 U.S.C. 154(b) by 40 days.

(21) Appl. No.: 16/401,509

(22) Filed: May 2, 2019

(65) Prior Publication Data

US 2019/0259053 A1 Aug. 22, 2019

Related U.S. Application Data

(63) Continuation of application No. 14/038,949, filed on Sep. 27, 2013, now Pat. No. 10,304,077.

(51) Int. Cl.
  *G06Q 30/02* (2012.01)
(52) U.S. Cl.
  CPC ..... *G06Q 30/0239* (2013.01); *G06Q 30/0255* (2013.01)
(58) Field of Classification Search
  CPC .......... G06Q 30/0239; G06Q 30/0255
  See application file for complete search history.

(56) References Cited

U.S. PATENT DOCUMENTS

| 7,933,818 B1* | 4/2011 | Kumar | G06Q 40/00 705/26.1 |
| 8,683,348 B1* | 3/2014 | Blank | G06F 3/038 715/709 |
| 2002/0062245 A1* | 5/2002 | Niu | G06Q 30/0253 705/14.51 |
| 2010/0100417 A1* | 4/2010 | Nussel | G06F 16/9535 705/14.54 |
| 2011/0106605 A1* | 5/2011 | Malik | G06Q 30/0224 705/14.23 |
| 2011/0238497 A1 | 9/2011 | Milne et al. | |
| 2012/0166268 A1* | 6/2012 | Griffiths | G06Q 30/0222 705/14.23 |

(Continued)

OTHER PUBLICATIONS

Automatic Coupon Finders—Do they really help you save money (Published at https://makeuseof.com/tag/automatic-coupon-finders-do-they-really-help-you-save-money on Jan. 15. 2013) (Year: 2013).*

(Continued)

*Primary Examiner* — James M Detweiler
(74) *Attorney, Agent, or Firm* — Alston & Bird LLP

(57) ABSTRACT

Methods, apparatus and computer program products are provided for providing real time incentives during browsing sessions on a promotional system. The real time incentives may convert browsing consumers to buyers by providing incentives (e.g., discounts) that may be redeemed during the browsing sessions. Qualification constraints may be evaluated using an event handler to determine whether an incentive should be offered. Participation constraints may define terms which should be met for a consumer to redeem the incentive.

17 Claims, 18 Drawing Sheets

(56) References Cited

U.S. PATENT DOCUMENTS

| | | | | |
|---|---|---|---|---|
| 2013/0006743 | A1* | 1/2013 | Moore | G06Q 30/02 |
| | | | | 705/14.58 |
| 2013/0027227 | A1 | 1/2013 | Nordstrom | |
| 2014/0067505 | A1* | 3/2014 | Ron | G06Q 30/02 |
| | | | | 705/14.25 |
| 2014/0304091 | A1* | 10/2014 | Maw | G06Q 30/0277 |
| | | | | 705/14.73 |
| 2014/0359407 | A1* | 12/2014 | Demsey | G06F 16/94 |
| | | | | 715/205 |
| 2015/0019307 | A1 | 1/2015 | Girard et al. | |

OTHER PUBLICATIONS

Automatic Coupon Finders—Do they really help you save money—Published at https://www.makeuseof.com/tag/automatic-coupon-finders-do-they-really-help-you-save-money/on Jan. 15, 2013.
U.S. Appl. No. 14/038,949, filed Sep. 27, 2013, U.S. Pat. No. 10,304,077, Patented.

\* cited by examiner

Figure 2A

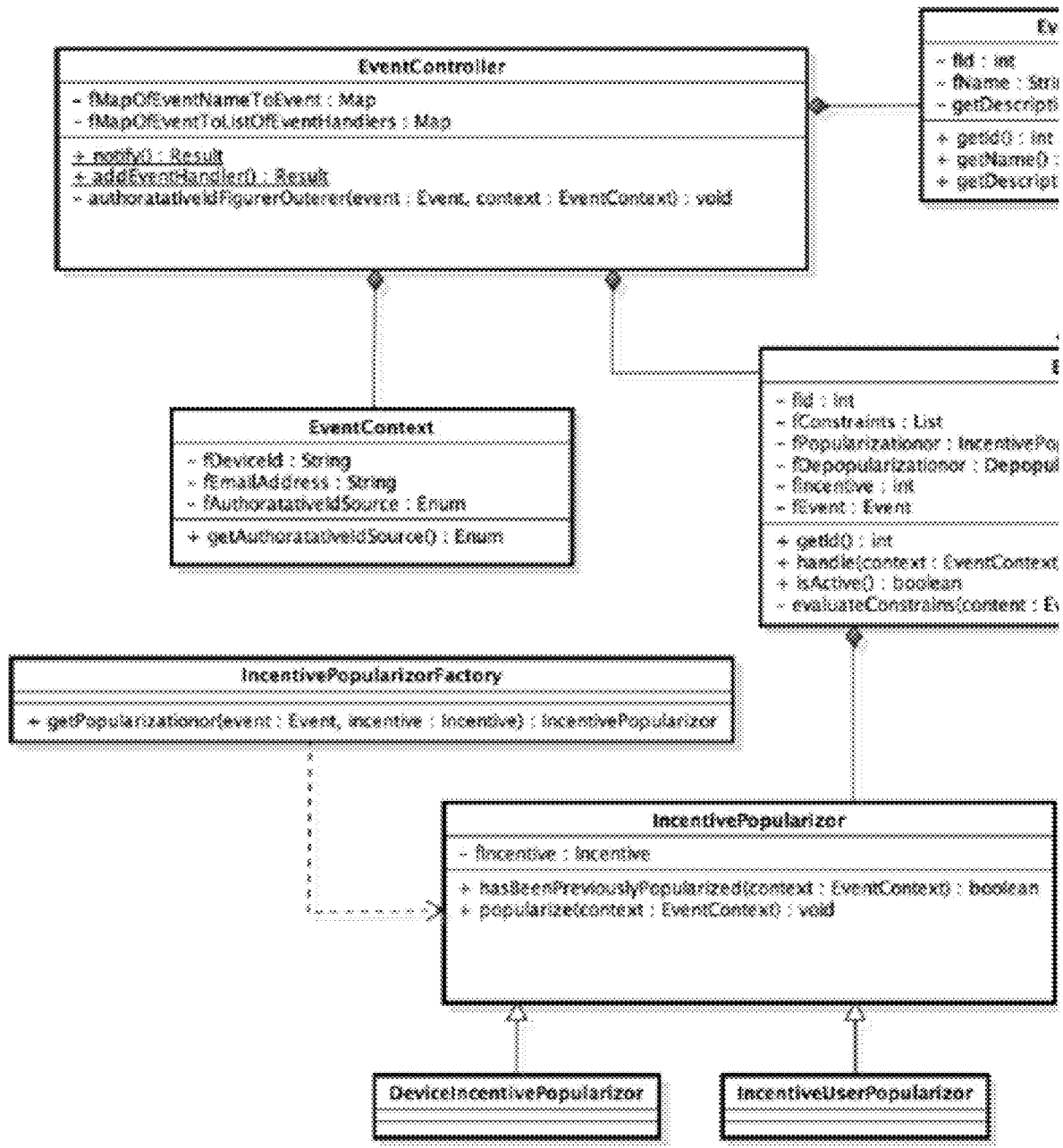
Figure 6 (1 of 2)

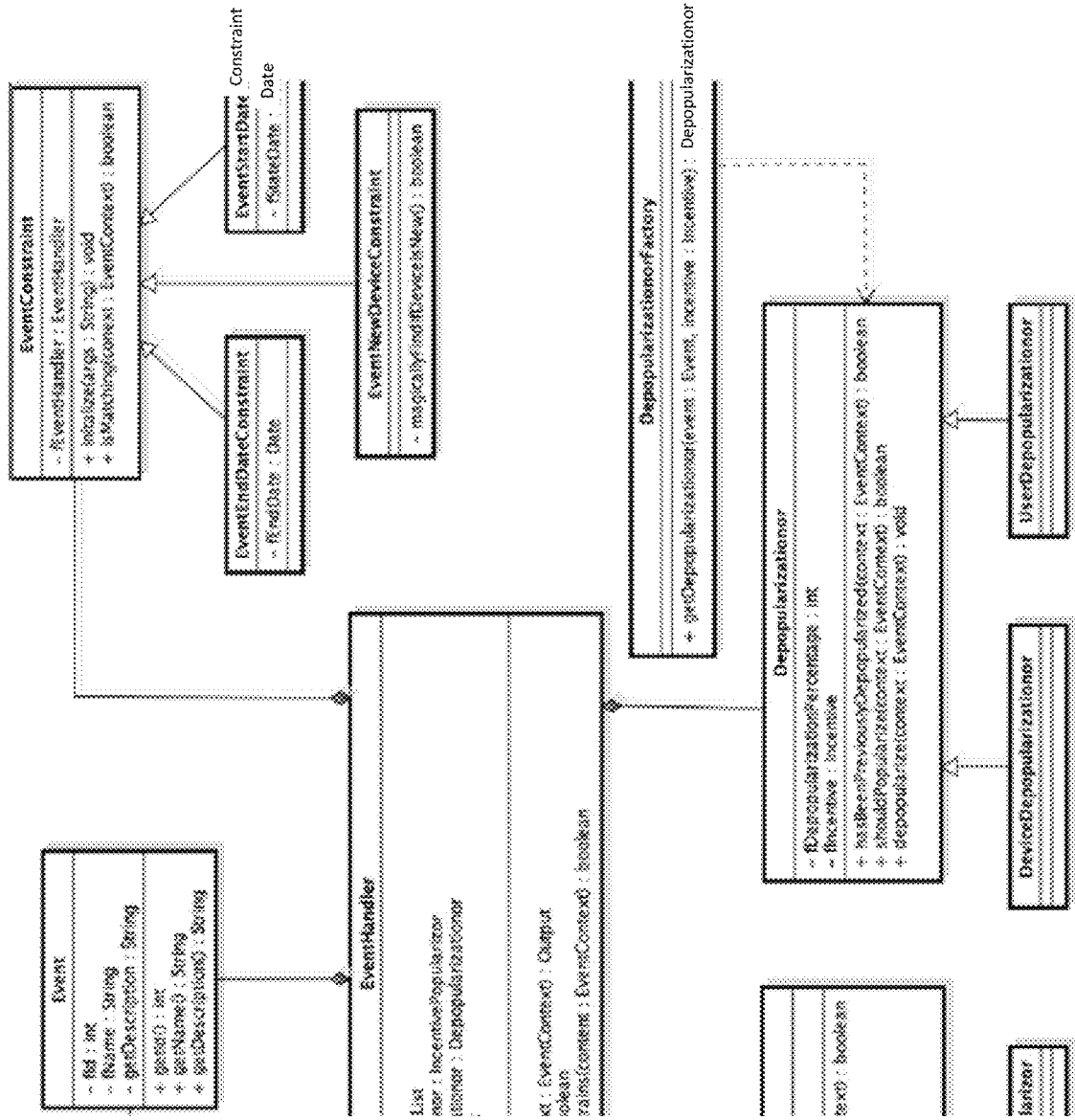
Figure 6 (2 of 2)

METHOD, APPARATUS, AND COMPUTER PROGRAM PRODUCT FOR PROVIDING REAL TIME INCENTIVES

CROSS REFERENCE TO RELATED APPLICATION

This application is a continuation of and claims priority to U.S. application Ser. No. 14/038,949, filed Sep. 27, 2013, the entire contents of which are hereby incorporated by reference.

BACKGROUND

Various embodiments of the invention are related to promotional systems, and particularly to a method and apparatus for providing a real time incentive to a user of a promotional system. Applicant has discovered problems with and related opportunities for improving sales of promotions. Through applied effort, ingenuity, and innovation, Applicant has solved certain identified problems by developing a solution that is embodied by the present invention, which is described in detail below.

BRIEF SUMMARY

Methods, apparatus, and computer program product are therefore provided for providing real time incentives. A real time incentive may be provided to consumers of promotions via a promotional system.

A method is provided for providing an incentive on a promotional system in response to at least one consumer event in a browsing session, the method comprising receiving a consumer event indication, wherein the consumer event indication may be captured by an event handler in an instance in which the consumer performs at least one action while interacting with the promotional system in the browsing session, determining, with a processor, that an event handler criteria for offering the incentive is satisfied by the at least one action, calculating a value of the incentive, and causing display of an incentive indication in the browsing session, wherein the incentive indication comprises at least the value of the incentive.

In some embodiments, the incentive indication comprises an offer to purchase a promotion via the promotional system, wherein the promotion provides a service or product at a first discount and the value of the incentive is a second discount that may be applied to a purchase of the promotion. Calculating the value of the incentive may comprise calculating the value based on at least one of an accepted value or promotional value of a promotion. The consumer event indication indicates the consumer using a mobile application for a first time. The event handler criteria may comprise at least one of an elapsed amount of time of the browsing session, a number of viewed promotions in the browsing session, and an elapsed amount of time since a previous browsing session.

In some embodiments, the method further includes receiving participation constraints to be associated with the incentive, wherein the incentive indication comprises the participation constraints, and enforcing the participation constraints during redemption of the incentive in the browsing session. The incentive may be redeemable only for a predetermined amount of time and only during the browsing session. In some embodiments, the incentive is based on a previous purchase history of the consumer.

In some embodiments, the method further includes providing analytics data based on at least one of usage of the incentives, the analytics data relating to at least one of a percentage of offered incentives redeemed, revenue received from purchases using incentives, elapsed time between an incentive offering and redemption, and consumer characteristics of consumers who redeemed or did not redeem incentives. The method may include identifying a control group based on the event handler criteria being satisfied, preventing incentives from being provided during a browsing session associated with the control group, identifying a treatment grouped based on the event handler criteria being satisfied, providing incentives during a browsing session associated with the treatment group, and generating analytics data based on a comparison of purchase data from the control group and purchase data from the treatment group.

In some embodiments, the method includes, during the browsing session, identifying at least two incentives having event handler criteria satisfied and identifying a best incentive of the at least two incentives. In some embodiments, the method includes receiving incentive information comprising qualification constraints and participation constraints, and storing the incentive information in a database.

An apparatus is provided for providing an incentive on a promotional system in response to at least one consumer event in a browsing session, the apparatus comprising at least one processor and at least one memory including computer program code, the at least one memory and the computer program code configured to, with the processor, cause the device to at least receive a consumer event indication, wherein the consumer event indication may be captured by an event handler in an instance in which the consumer performs at least one action while interacting with the promotional system in the browsing session, determine that an event handler criteria for offering the incentive is satisfied by the at least one action, calculate a value of the incentive, and cause display of an incentive indication in the browsing session, wherein the incentive indication comprises at least the value of the incentive.

A computer program product is provided for providing an incentive on a promotional system in response to at least one consumer event in a browsing session, the computer program product comprising at least one non-transitory computer-readable storage medium having computer-executable program code instructions stored therein, the computer-executable program code instructions comprising program code instructions to receive a consumer event indication, wherein the consumer event indication may be captured by an event handler in an instance in which the consumer performs at least one action while interacting with the promotional system in the browsing session, determine that an event handler criteria for offering the incentive is satisfied by the at least one action, calculate a value of the incentive, and cause display of an incentive indication in the browsing session, wherein the incentive indication comprises at least the value of the incentive.

Additional features and advantages of the present invention will be set forth in portion in the description which follows, and in portion will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE SEVERAL VIEWS OF THE DRAWINGS

FIGS. 2A and 2B are example displays for creating an incentive on a promotional system according to an example embodiment;

FIG. 6 is an example class diagram for providing an incentive on a promotional system according to an example embodiment;

DETAILED DESCRIPTION

Figure 1:
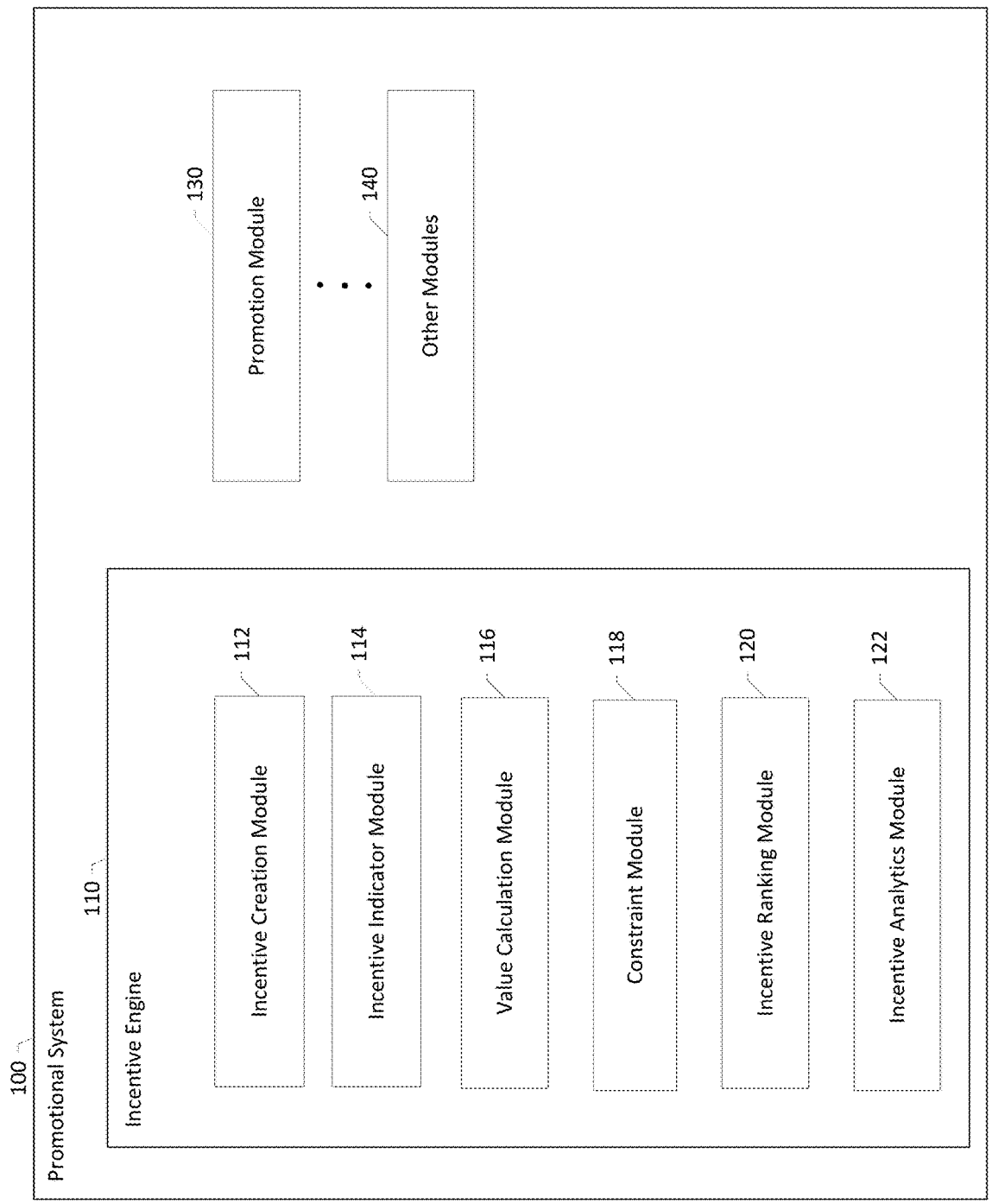
FIG. 1 is a schematic representation of a promotional system according to an example embodiment.

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the other computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

In some example embodiments, the method, apparatus and computer program product described herein is configured to provide real-time incentives, such as on a promotional system.

As used herein, the term "promotion and marketing service" may include a service that is accessible via one or more computing devices and is operable to provide example promotion and/or marketing services on behalf of one or more providers that are offering one or more promotions that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue promotions upon acceptance of an offer, participate in redemption, generate rewards, provide a point of sale device or service, issue payments to providers and/or or otherwise participate in the exchange of goods, services or experiences for currency, value and/or the like.

As used herein, the term "provider" may include, but is not limited to, a merchant, business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. One example provider may be a running company that sells attire for use by a person who runs or participates in athletic activities.

As used herein, the term "promotion" may include, but is not limited to, any type of offered, presented or otherwise indicated reward, discount, coupon, credit, deal, discount, media or the like that is indicative of a promotional value or the like that upon purchase or acceptance results in the issuance of a promotion that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a promotional value (e.g., the value of the resultant promotion when redeemed at the provider), a residual value (e.g., the value upon return or upon expiry of one or more redemption parameters), one or more redemptions parameters and/or the like. Using the running company promotion as an example, the accepted value is $25 and the promotional value is $50. In this example, the residual value may be equal to the accepted value.

As used herein, the term "consumer" may include, but is not limited to, a client, customer, purchaser, shopper, user or the like who may be in the position to or does exchange value for one or more promotions. For example, and using the aforementioned running company as the example provider, an individual who is interested in purchasing running shoes. A consumer may purchase a promotion via a promotional system and redeem the promotion at a provider.

As used herein, the term "incentive" may include, but is not limited to, a discount on the purchase of a promotion, such as a discount off the accepted value. In some embodiments, the incentive may include a discount equivalent to the accepted value, meaning the promotion may be free to the consumer.

A consumer may browse various promotions on the promotional system via a web interface, such as using an internet browser, an app, or similar function providing access and visualization. The promotional system, according to example embodiments described herein, may dynamically provide a real time incentive to a consumer, based on a consumer action (e.g., a user interaction with the promotional system) and a variety of factors including but not limited to prior purchase history of the consumer, an elapsed amount of time since a previous purchase, an elapsed amount of time spent browsing a promotion or number of promotions, a first time accessing a mobile version of the promotional system interface and/or a consumer viewing a threshold number of promotions, for example.

As used herein, the term "incentive indication" may include, but is not limited to, information provided by a user interface describing an incentive, incentive value, and/or participation constraints. For example, a consumer may be presented with an incentive indication indicating a $10 discount off a promotion the consumer purchases during a browsing session. The consumer may therefore purchase for only $15 the promotion having a $50 promotional value that normally has an accepted value of $25. An incentive indication may be presented real time, such as during a browsing session (e.g., hypertext transfer protocol (HTTP) session, or other defined instance of an information exchange between devices) in which an event occurred that resulted in the incentive being provided. The incentive may therefore increase an amount of sales of promotions and/or convert a higher percentage of browsers to buyers by encouraging closing of a sale of the purchase of a promotion.

An incentive may be characterized by qualification constraints and/or participation constraints. As used herein, the term "qualification constraints" may include, but is not limited to, criteria that must be met for the incentive to be offered to a consumer. The qualification constraints therefore may not be explicitly provided to the consumer, but rather an incentive indication may be provided to a consumer in an instance the criteria are met. As such, the consumer may not know the specific reason the consumer qualified for the incentive.

As used herein, the term "participation constraints" may include, but is not limited to, criteria which must be satisfied for the consumer to redeem the incentive. The participation constraints may therefore be made known to the consumer (e.g., as a part of or with the incentive indication) so the consumer understands what criteria must be satisfied to redeem the incentive.

FIG. 1 is a schematic representation of a promotional system according to an example embodiment. A promotion and marketing service may offer its services via a promotional system 100, accessible via one or more computing devices. In some example embodiments, a promotional system 100 may include an incentive engine 110, promotion module 130, and/or other modules 140. The components of the promotion module 130 and the other modules 140 are configured to provide various logic (e.g. code, instructions, functions, routines and/or the like) and/or services related to providing promotions to consumers.

The incentive engine 110 may be configured to enable the creation, modification, and/or approval of incentives with the incentive creation module 112, to determine if and/or when an incentive may be offered to a consumer with incentive indicator module 114, and to calculate an incentive value with the value calculation module 116. The incentive engine 110 may be additionally configured to maintain and/or enforce incentive constraints with the constraint module 118, and to rank incentives with the incentive ranking module 120. Additionally or alternatively, the incentive engine 110 may provide analytics information with the incentive analytics module 122.

The promotional system 100 may therefore be configured to provide promotions to consumers, as well as real time incentives to encourage purchasing of promotions.

Figure 2A:
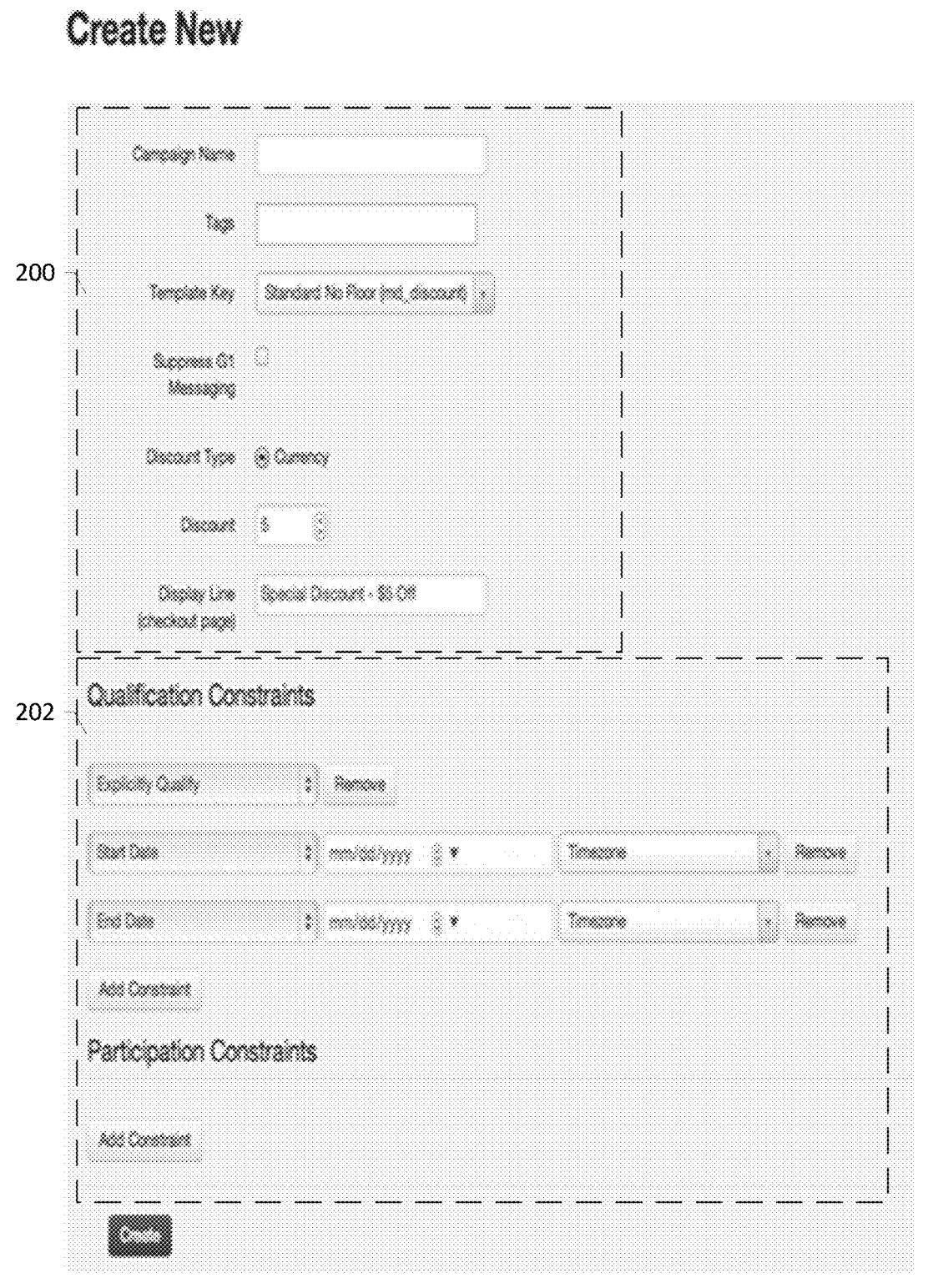
Figure 2B:
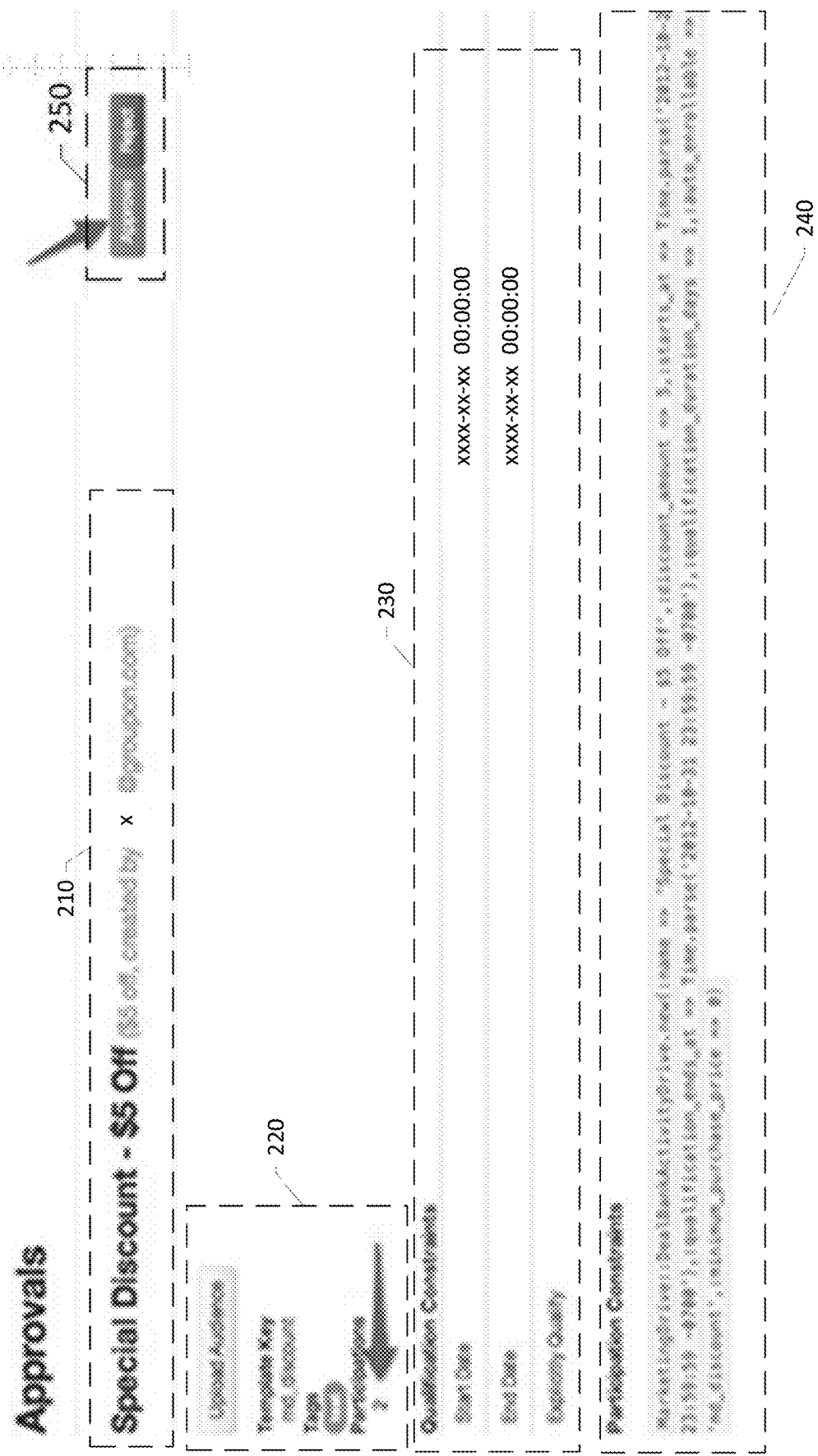

FIGS. 2A and 2B are example displays for creating and/or configuring an incentive on promotional system 100, according to an example embodiment. The displays of FIGS. 2A and 2B may be provided by incentive creation module 112, and accessed by an internal user of the promotional system, such as an employee or sales resource affiliated with the promotional service, for example. In some embodiments, the internal user may be associated with a provider, such as a provider partnering with the promotional service to offer a promotion redeemable at the provider.

FIG. 2A is an example display for creating an incentive. Area 200 may include an input in which a user may provide a campaign or incentive name. Tags may also be provided. The tags may be used internally for categorizing incentives and/or otherwise indicating keywords associated with the incentives so that the incentives may be easily located and/or tailored for specific use by other internal users.

Also in area 200, a template may be selected, such as "standard, no floor," indicating that the incentive has no minimum purchase amount required. The template may define a message that may be displayed to a consumer explaining the participation constraints and/or presenting the incentive value to the consumer. The template may be used to generate content to be transmitted to a consumer by email or by a real time incentive indication, for example.

An option to suppress messaging may be enabled or disabled, indicating whether the consumer will receive an incentive indication via email, in addition to a real time indication, for example. A discount type may be selected, such as currency, percentage off, promotion-code and/or Wow deals (e.g., a special promotion or offering). An input for a display line, such as a display line of an incentive indication may be provided. The desired text to display to a consumer may therefore be provided by the internal user. An internal user may enter any or all of the data into the fields of area 200 to provide incentive information.

Area 202 may provide input fields for an internal user to enter constraints for the incentive. For example, an internal user may select a qualification type, such as "explicitly qualify," meaning that an audience may be provided, such as a file and/or list of email addresses and/or user id's of consumers who will explicitly receive the incentive indication. Additional qualification types may include "real-time" or "audience reference." "Real time" may indicate that an event handler may evaluate criteria based on consumer actions during a browsing session, and the incentive may be offered real time during the browsing session if the criteria is met. An "event handler" may be considered a computer program routine that receives an input, such as an input generated by an application and/or consumer using an application, and determines an outcome that should occur based on the input. "Audience reference" may be some reference or identifier to a pre-defined audience, such as provided by other modules 140 of the promotional system 100. Start and end dates and corresponding time zones may be entered, defining a time period in which the incentive may be offered.

An internal user may select an "add constraint" button to provide constraint parameters. The additional constraint parameters may include any number of criteria, for example, an elapsed amount of time since a previous purchase, redemption start and end dates, an elapsed amount of time spent browsing a promotion and/or a consumer viewing a threshold number of promotions, for example. In some embodiments, a constraint may require an incentive is offered only upon a first visit to a mobile site of the promotion system 100, for example. A constraint may be coupled with other constraints and/or criteria. Constraints and/or criteria may vary depending upon use, such as being lower if using a mobile device and mobile site or app, for example. The qualification constraints are provided by way of example, and it will be appreciated that a variety of other constraints may be entered by a user. The qualification constraints provided in area 202 may therefore define criteria which must be met for the incentive engine 110 to provide the incentive to a consumer.

Participation constraints may also be provided in area 202. An internal user may therefore enter participation constraints by selecting the "add constraint" button. Participation constraints may include criteria than such as a timer expiration (e.g., 5 minutes from the display time of the incentive), minimum purchase amount, expiration timestamp (e.g., midnight on January xx, 20xx), and/or the like. The participation constraints may define requirements which must be satisfied for the consumer to redeem the incentive.

FIG. 2B is an example display that may be used by an internal user of the promotional system 100, for example, to approve an incentive, such as an incentive created with the use of the display of FIG. 2A, for example. The internal user who approves an incentive using the display of FIG. 2B may have a different level of security than that of the user of the display of FIG. 2A who creates the incentive. The level of security may be required for the internal user to approve an incentive.

Area 210 may display incentive information, such as an incentive value (e.g., $5 off), and a creator's email address and/or user id. Area 220 may include an "upload audience" button, allowing a user to upload a file of email addresses and/or user ids of consumers who will receive an indication of the incentive via email, in addition to, or alternatively to the real time indication in a browsing session. An email and/or user id list defining the audience may be generated with use of other modules 140 of the promotional system 100, for example. A template key may be provided, indicating a template to be used for messaging information regarding incentives to consumers, for example. Area 210 may also include tags, which may be confirmed, and/or edited by an internal user. Participation may be provided, such as when the audience is explicitly qualified. The participation may indicate a number of users included in the audience.

Area 230 may provide qualification constraints, defining constraints for an incentive offering, such as a start and end date (e.g., the date range in which the incentive may be offered), and the qualification type, such as "explicitly qualify," "real time" and/or "audience reference." Other examples of qualification constraints are provided herein.

Area 240 may provide participation constraints, defining constraints for incentive redemption, such as a start and end date (e.g., the date range in which the incentive may be redeemed) and/or minimum purchase price, for example. Other examples of participation constraints are provided herein.

Area 250 may provide approve and reject buttons, allowing an internal user to approve or reject an incentive. Selection of the approval button may result in various operations depending on the qualification type. For incentives having a qualification type of "explicitly qualify," in some embodiments, an email may be generated based on the template type, and transmitted to audience members listed in the provided audience file or defined by the audience reference. For incentives having a qualification type of "real time," the incentive and associated constraints may be saved as an active incentive in the promotional system 100, such as with incentive creation module 112. Following approval of the real time incentive, an event handler may test criteria (e.g., qualification constraints) during a consumer browsing session and offer an incentive in instances the criteria is satisfied.

Selection of the reject button may result in transmittal of a notification to the creator of the incentive, and/or deletion of the incentive information from the promotional system 100. In some embodiments, the incentive information may be saved to allow the creator to modify some incentive information and re-submit the modified incentive for approval.

Figure 3A:
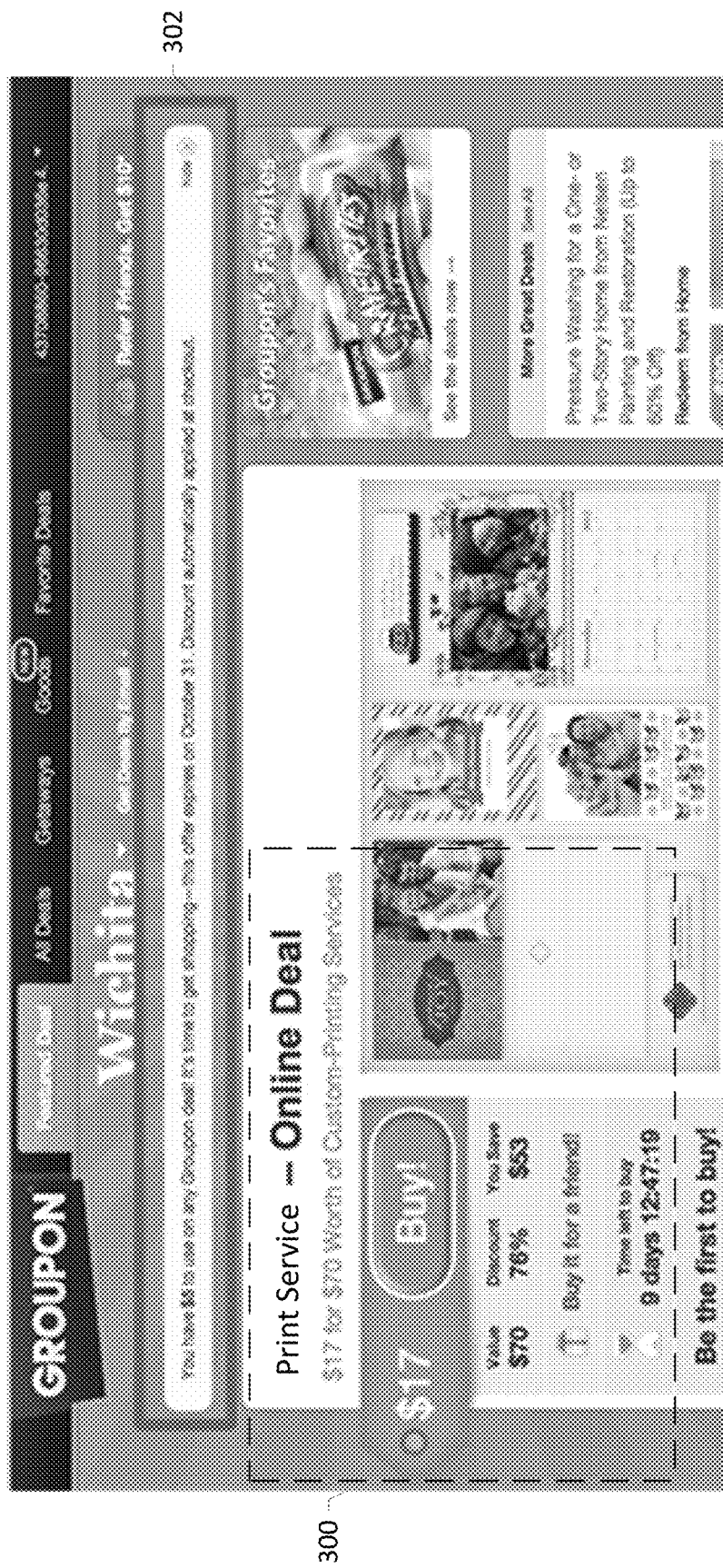
FIGS. 3A-3H are example displays for providing an incentive on a promotional system according to an example embodiment.

FIG. 3A is an example display that may be provided by promotional system 100, such as with promotion module 130, incentive indicator module 114, and/or other modules 140, and accessed by a consumer during a browsing session. For example, a consumer may view an impression of a promotion, in area 300, which indicates an accepted value of $17 for a promotional value of $70 to be redeemed at Print Service (an example provider). Upon determining that criteria (e.g., qualification constraint) of an incentive are satisfied, such as with constraint module 118, an incentive indication may be provided in area 302, such as with incentive indicator module 114. The incentive indication provides the incentive value (e.g., $5) and a participation constraint (e.g., the expiration date October 31) to the consumer.

Figure 3B:
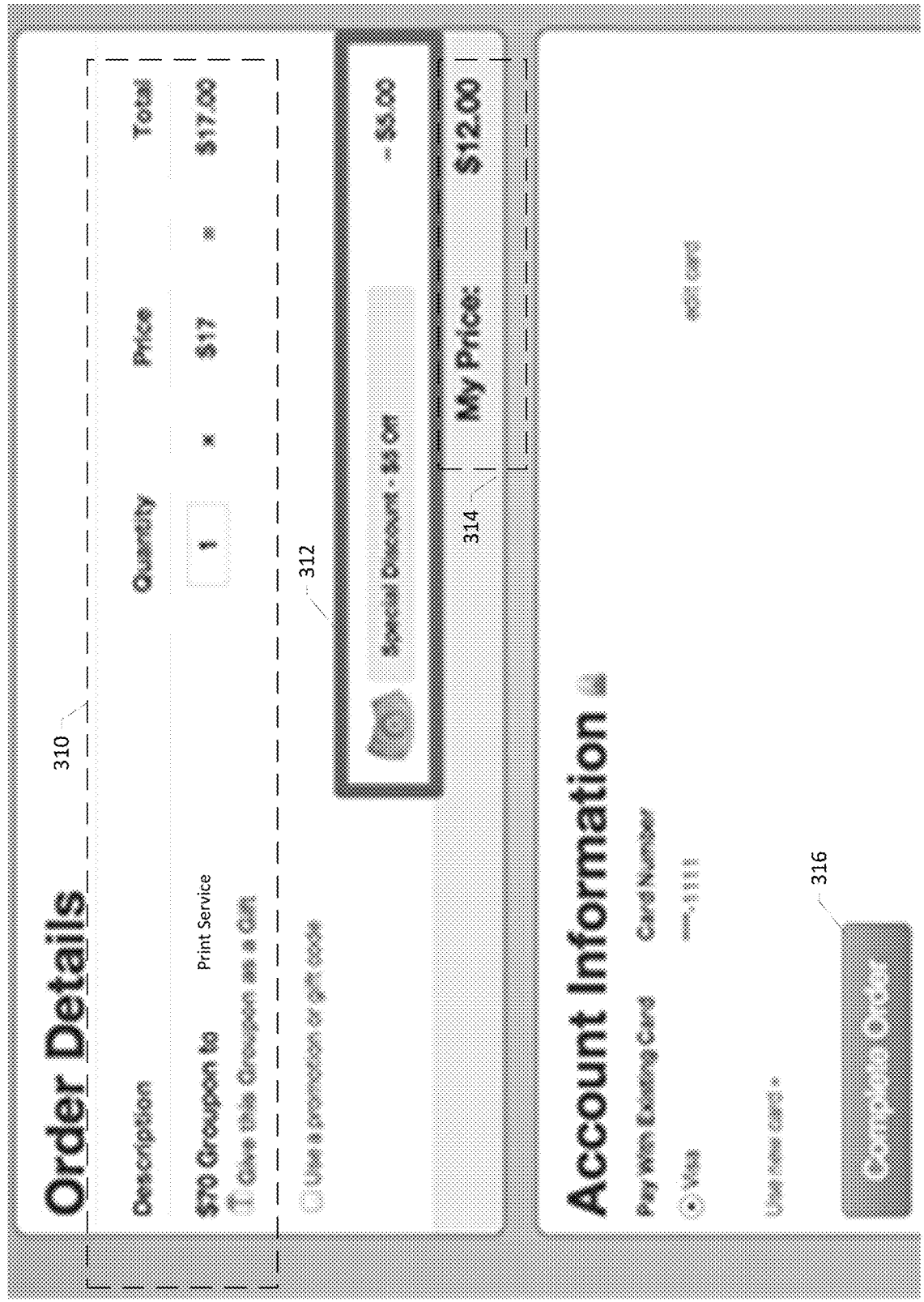

FIG. 3B is an example display that may be provided by promotional system 100, such as with promotion module 130, incentive indicator module 114, and/or other modules 140, and accessed by a consumer to complete an order. Area 310 provides promotion information, such as a promotional value, provider, quantity, and accepted value. Area 312 provides an incentive indication that may be provided by incentive indicator module 114. The incentive value of $5 is discounted from the accepted value of $17 to result in a total of $12, as shown in area 314. A consumer may select the complete order button 316 to purchase promotion and redeem the incentive.

Figure 3C:
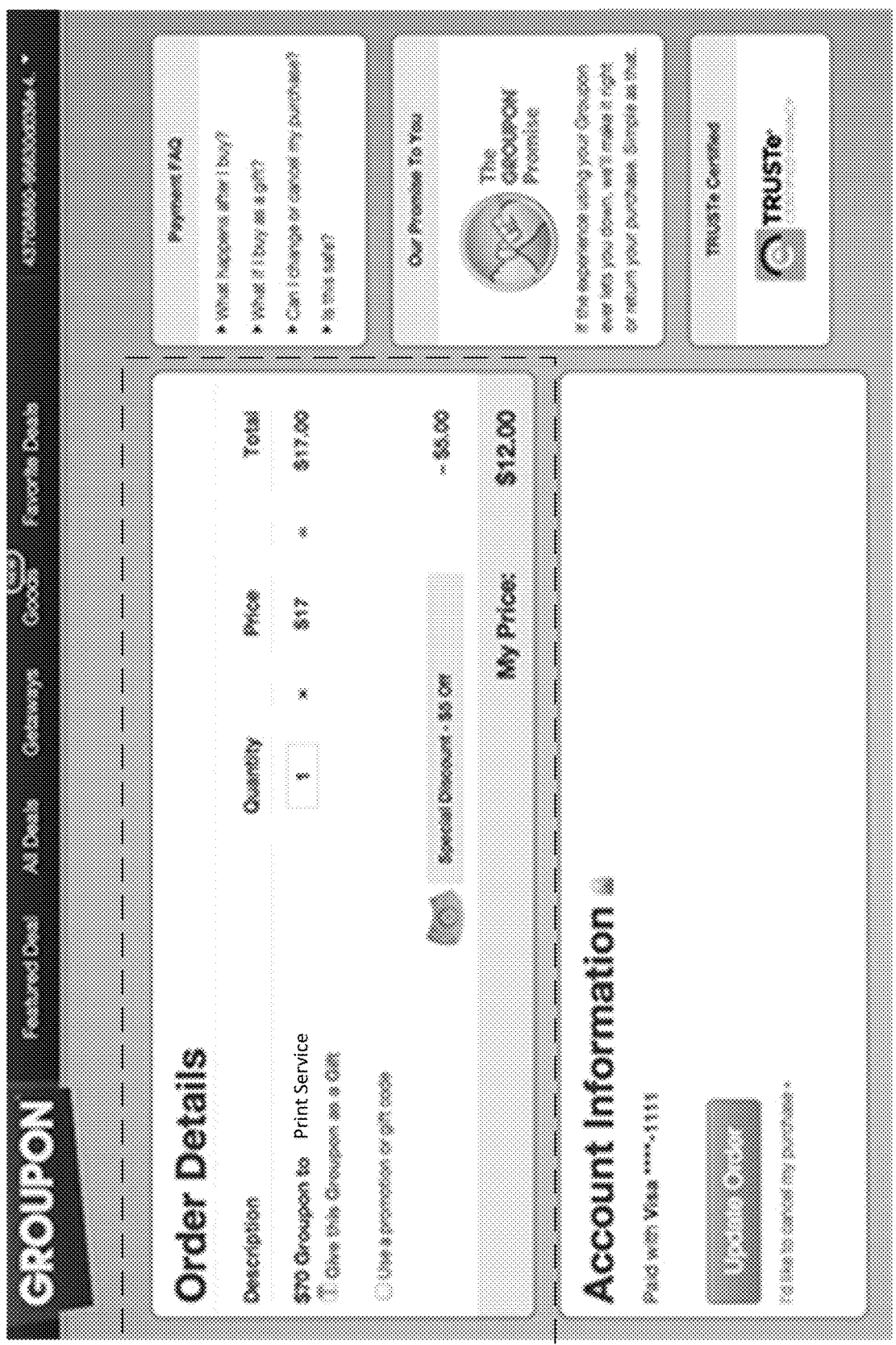

FIG. 3C is an example display that may be provided by promotional system 100, such as with promotion module 130, incentive indicator module 114, and/or other modules 140, and accessed by a consumer to view order details. Area 320 may provide the information displayed in FIG. 3B, including the incentive value applied to the purchase of the promotion.

Figure 3D:
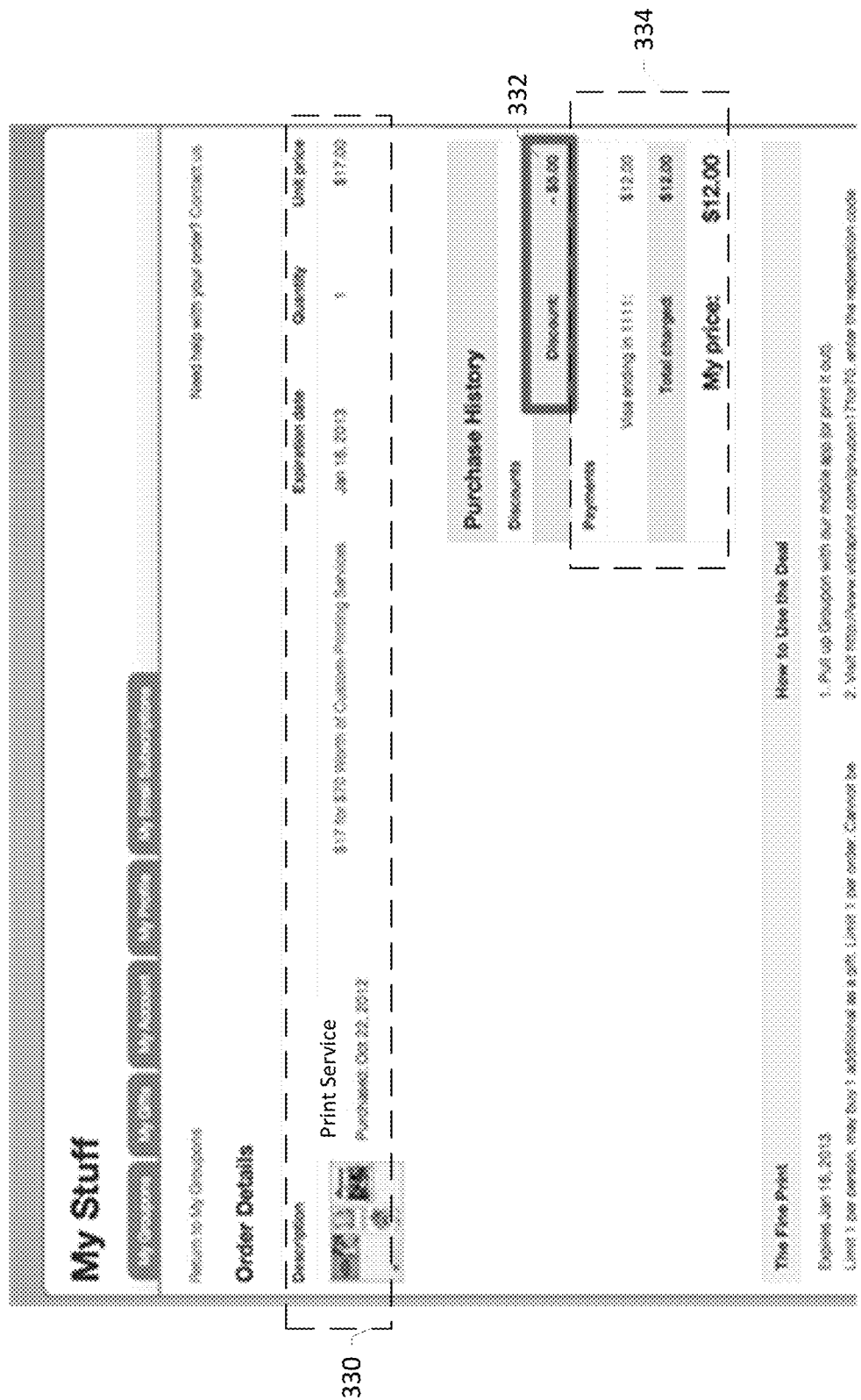

FIG. 3D is an example display that may be provided by promotional system 100, such as with promotion module 130, incentive indicator module 114, and/or other modules 140, and accessed by a consumer to view order history. Area 330 may provide the promotion information. Area 332 may provide the value of the incentive applied to the purchase, and area 334 may provide the total cost paid.

Figure 3E:
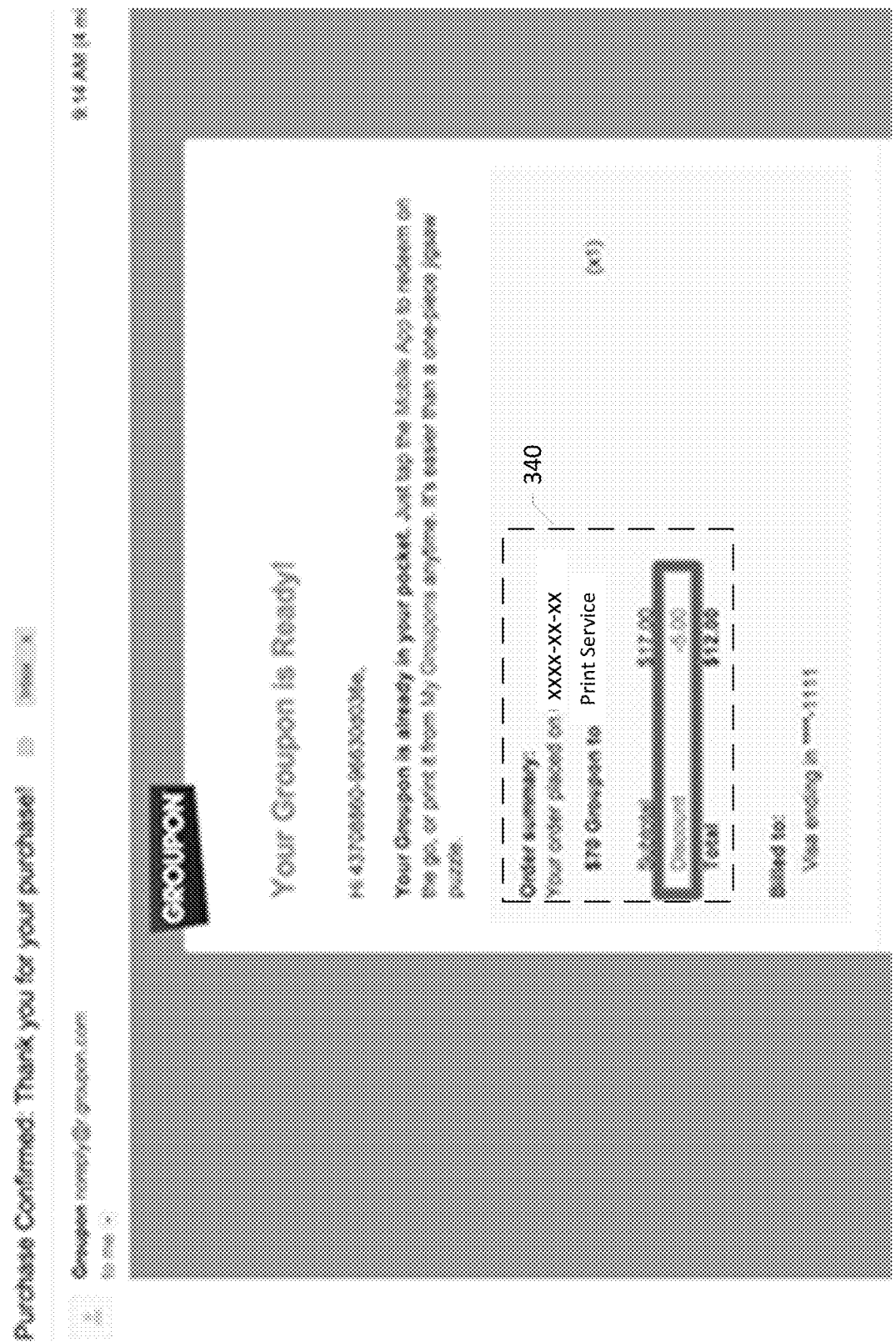

FIG. 3E is an example display of an email that may be provided by promotional system 100, such as with promotion module 130, incentive indicator module 114, and/or other modules 140, and received by a consumer to view a confirmation of a promotion purchase. Area 340 may provide the promotion information, the value of the incentive applied to the purchase, and the total cost paid.

Figure 3F:
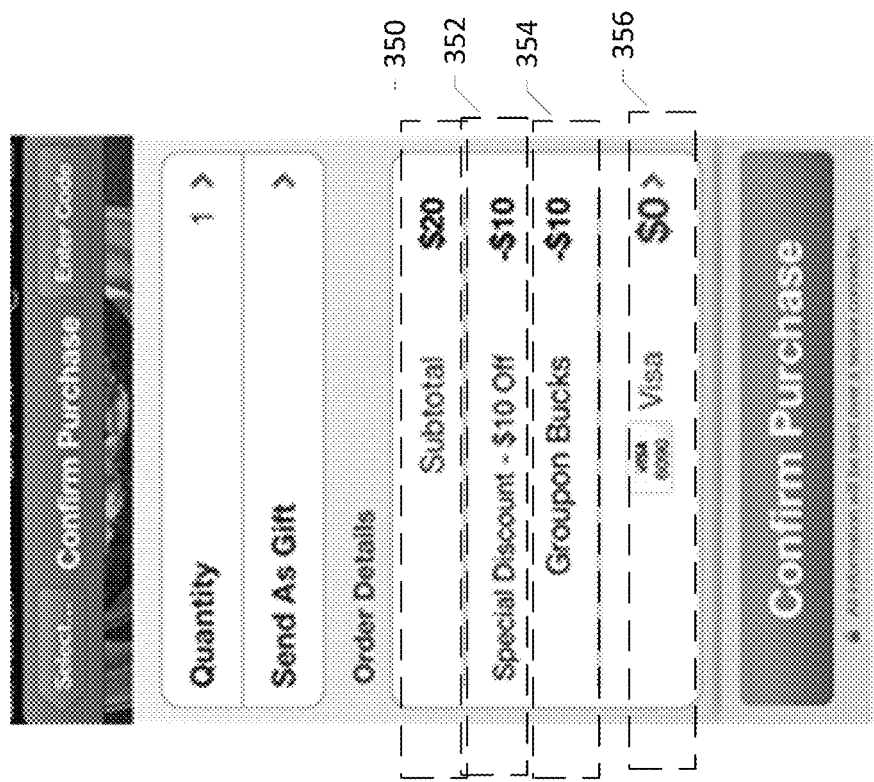

FIG. 3F is an example display that may be provided by promotional system 100, such as with promotion module 130, incentive indicator module 114, and/or other modules 140, and to view order details using certain mobile devices. The cost, or accepted value of the promotion may be presented as a subtotal in area 350, the incentive may be applied in area 352, showing a discount based on the incentive value. Additional discounts may be applied in area 354, and a total cost to the consumer may be provided in area 356.

Figure 3G:
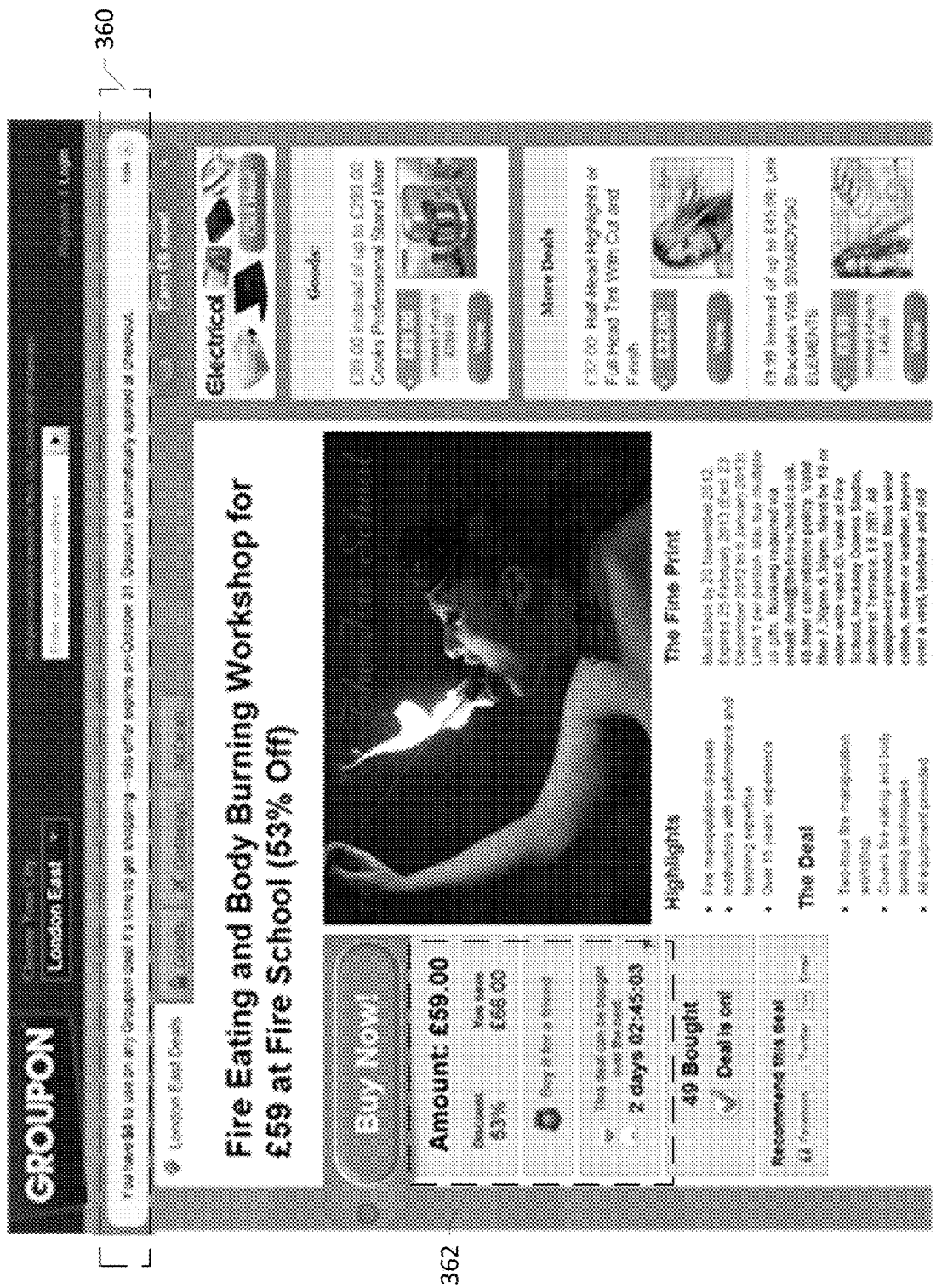

FIG. 3G is an example display that may be provided by promotional system 100, such as with promotion module 130, incentive indicator module 114, and/or other modules 140, and accessed by a consumer during a browsing session.

An incentive indication may be displayed in area 360, and promotion information may be displayed in area 362.

Figure 3H:
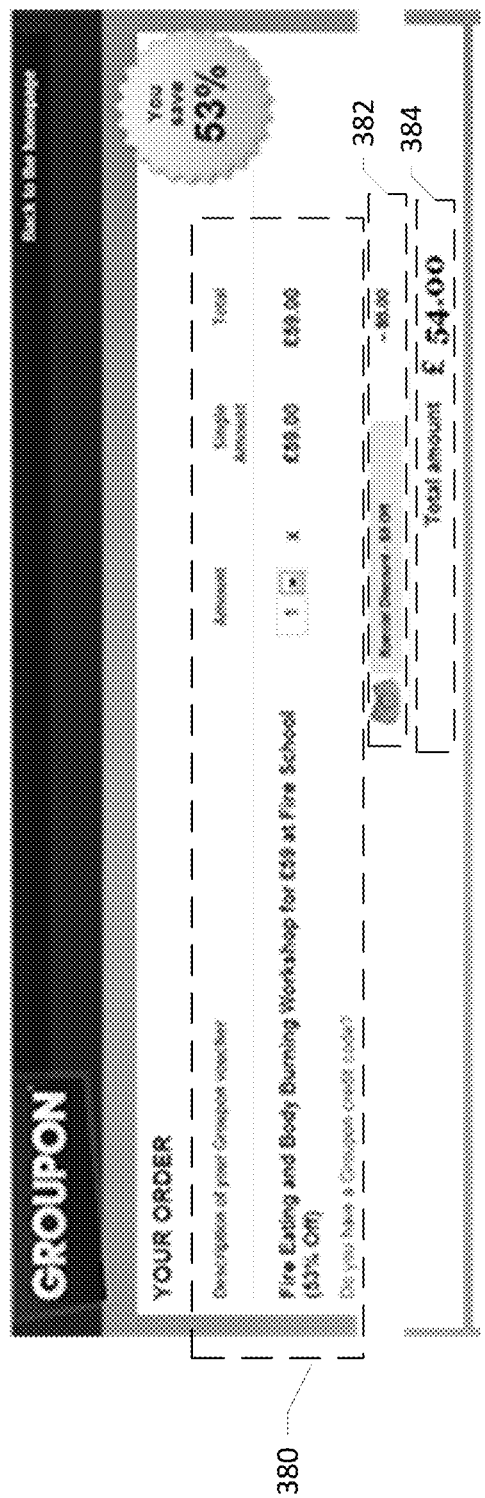

FIG. 3H is another example display that may be provided by promotional system 100, such as with promotion module 130, incentive indicator module 114, and/or other modules 140, and accessed by a consumer to view the details of an order. Area 380 may include promotion information, area 382 may provide the applied incentive value shown as a discount off the accepted value of purchasing the promotion, and area 384 may provide the total charged to the consumer.

Figure 4:
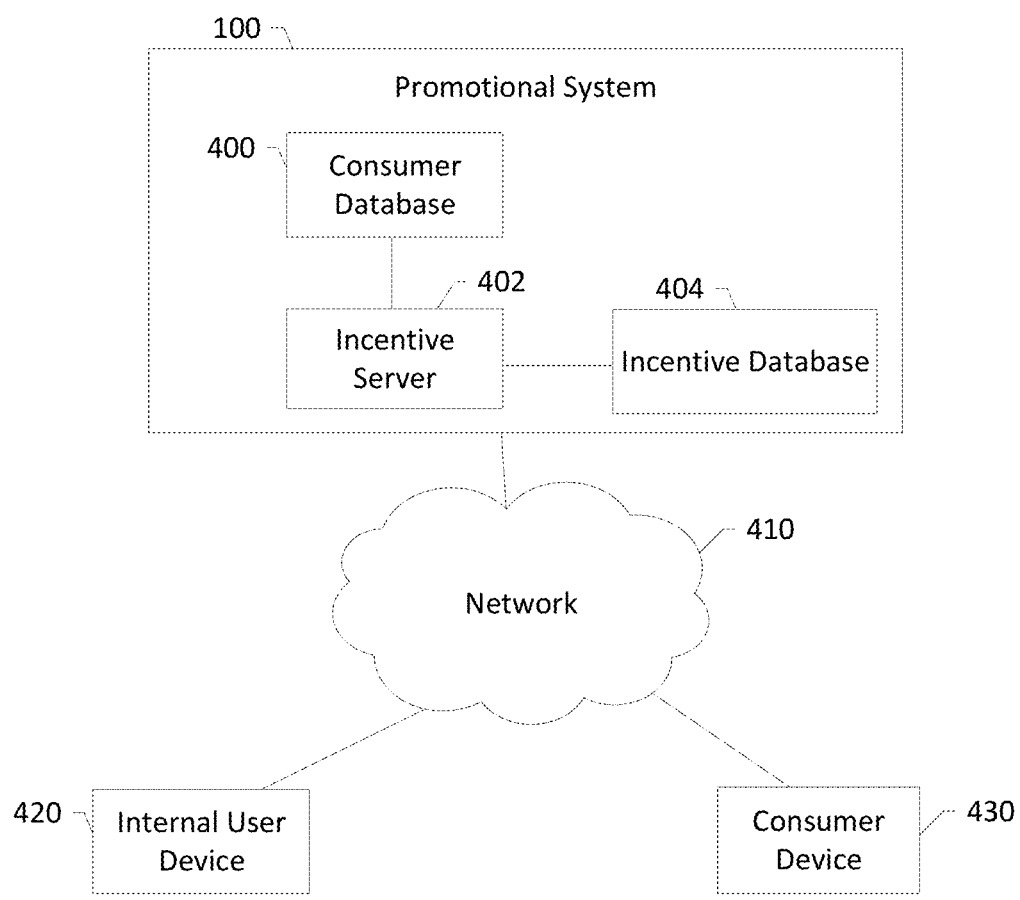
FIG. 4 is a schematic representation of a promotional service environment according to an example embodiment.
Figure 5:
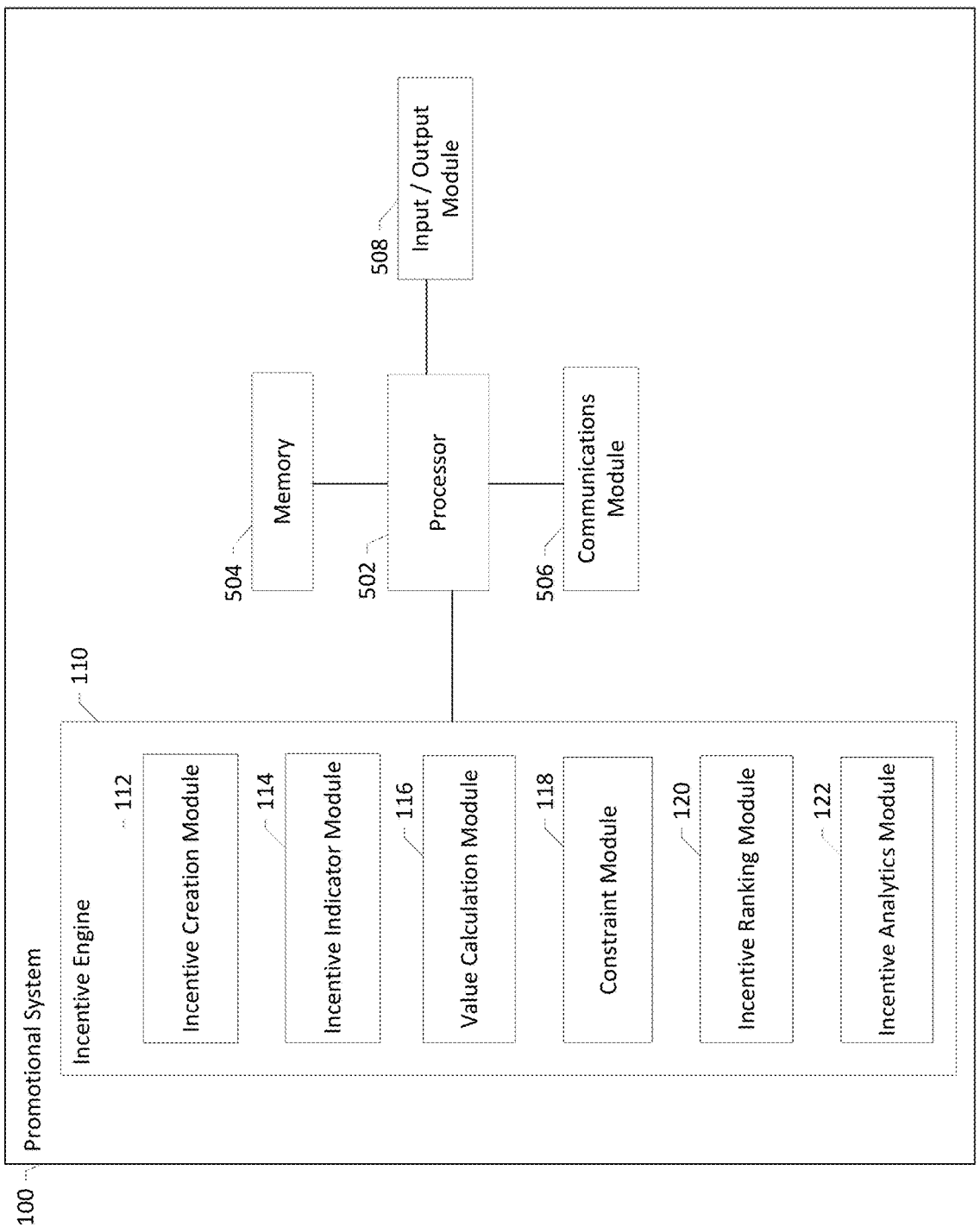
FIG. 5 is a schematic representation of a promotional system according to an example embodiment.

Having now provided example displays provided by promotional system 100, FIGS. 4 and 5 describe in further detail the systems and corresponding components configured to provide such displays and functionality described herein.

FIG. 4 is a schematic representation of a promotional service environment according to an example embodiment. Promotional system 100 may include, for example, consumer database 400, incentive server 402, and incentive database 404, among other things (not shown).

Incentive server 402 can be any suitable network server and/or other type of processing device configured to manage incentive operations of the promotional system 100 and at least process data received from the consumer database 400 and/or incentive database 404. The incentive server 402 may additionally or alternatively process incoming data to the promotional system 100, and may in some embodiments, include incentive engine 110. Consumer database 400 may be any suitable network database configured to store data regarding consumers, who may be targeted with incentives, such as discussed herein. Incentive database 404 may be any suitable network database configured to store data regarding incentives, such as described herein. The incentive engine 110 of the incentive server 402 may therefore be configured to process received data from the incentive database 404 and/or to store data to the incentive database 404. In some embodiments, the consumer database 400 may be implemented on the same device as the incentive database 404. In this regard, promotional system 100 may include, for example, at least one backend data server, network database, cloud computing device, or similar device.

Promotional system 100 may be coupled to one or more internal user devices 420 and/or consumer devices 430 via network 410. In this regard, network 410 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 410 may include a cellular telephone, an 802.11, 802.16, 802.20, and/or WiMax network. Further, the network 410 may include a public network, such as the Internet, a private network, such as an intranet, or combinations thereof, and may utilize a variety of networking protocols now available or later developed including, such as, but not limited to, TCP/IP based networking protocols.

Internal user device 420 may be implemented as a personal computer and/or other networked device, such as a cellular phone, tablet computer, mobile device, etc., that may be used for accessing promotional system 100 to create, modify, and/or approve incentives, for example. In some embodiments, incentive information such as incentive parameters and constraints, may be transmitted from an internal user device 420 to the promotional system 100, that may be used, for example to create an incentive. Promotional system 100 may be configured to communicate with one or more internal user devices 420 via network 410.

Consumer device 430 may be implemented as a personal computer and/or other networked device, such as a cellular phone, tablet computer, mobile device, etc., that may be used to access promotional system 100 to browse for and/or purchase promotions and/or redeem an incentive, for example. In some embodiments, information regarding a consumer and/or the consumer device 430 may be transmitted from a consumer device 430 to the promotional system 100 that may be used, for example, to target consumers with any appropriate incentives. Promotional system 100 may be configured to communicate with one or more consumer devices 430 via network 410.

FIG. 5 is a schematic representation of a promotional system 100 according to an example embodiment. As illustrated in FIG. 5, in accordance with some example embodiments, promotional system 100 may include various means, such as one or more processors 502, memories 504, communications modules 506, and/or input/output modules 508. In some embodiments, incentive engine 110 may be included, including incentive creation module 112, incentive indicator module 114, value calculation module 116, constraint module 118, incentive ranking module 120, and/or incentive analytics module 122. As referred to herein, the term "module" includes hardware, software and/or firmware configured to perform one or more particular functions. In this regard, promotional system 100 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 504) that is executable by a suitably configured processing device (e.g., processor 502), or some combination thereof.

Processor 502 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 5 as a single processor, in some embodiments, processor 502 comprises a plurality of processors. The plurality of processors may be embodied on a single computing device or may be distributed across a plurality of computing devices collectively configured to function as promotional system 100. The plurality of processors may be in operative communication with each other and may be collectively configured to perform one or more functionalities of promotional system 100 as described herein. In an example embodiment, processor 502 is configured to execute instructions stored in memory 504 or otherwise accessible to processor 502. These instructions, when executed by processor 502, may cause promotional system 100 to perform one or more of the functionalities of promotional system 100 as described herein.

Whether configured by hardware, firmware/software methods, or by a combination thereof, processor 502 may comprise an entity capable of performing operations according to embodiments of the present invention while configured accordingly. Thus, for example, when processor 502 is embodied as an ASIC, FPGA or the like, processor 502 may comprise specifically configured hardware for conducting one or more operations described herein. As another example, when processor 502 is embodied as an executor of instructions, such as may be stored in memory 504, the instructions may specifically configure processor 502 to perform one or more operations described herein, such as those discussed herein.

Memory 504 may comprise, for example, volatile memory, non-volatile memory, or some combination thereof. Although illustrated in FIG. 5 as a single memory, memory 504 may comprise a plurality of memory components. The plurality of memory components may be embodied on a single computing device or distributed across a plurality of computing devices. In various embodiments, memory 504 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. In some embodiments, memory 504 may comprise consumer database 400 and/or incentive database 404. Memory 504 may be configured to store information, data (including consumer information, incentive information, promotion information, and/or analytics data), applications, instructions, or the like for enabling promotional system 100 to carry out various functions in accordance with example embodiments of the present invention. For example, in at least some embodiments, memory 504 is configured to buffer input data for processing by processor 502. Additionally or alternatively, memory 504 may be configured to store program instructions for execution by processor 502. Memory 504 may store information in the form of static and/or dynamic information. This stored information may be stored and/or used by promotional system 100 during the course of performing its functionalities.

Communications module 506 may be embodied as any device or means embodied in circuitry, hardware, a computer program product comprising computer readable program instructions stored on a computer readable medium (e.g., memory 504) and executed by a processing device (e.g., processor 502), or a combination thereof that is configured to receive and/or transmit data from/to another device, such as, for example, a second promotional system 100 and/or the like. In some embodiments, communications module 506 (like other components discussed herein) can be at least partially embodied as or otherwise controlled by processor 502. In this regard, communications module 506 may be in communication with processor 502, such as via a bus. Communications module 506 may include, for example, an antenna, a transmitter, a receiver, a transceiver, network interface card and/or supporting hardware and/or firmware/software for enabling communications with another computing device. Communications module 506 may be configured to receive and/or transmit any data that may be stored by memory 504 using any protocol that may be used for communications between computing devices. Communications module 506 may additionally or alternatively be in communication with the memory 504, input/output module 508, and/or any other component of promotional system 100, such as via a bus.

Input/output module 508 may be in communication with processor 502 to receive an indication of a user input and/or to provide an audible, visual, mechanical, or other output to a user (e.g., internal user and/or consumer). As such, input/output module 508 may include support, for example, for a keyboard, a mouse, a joystick, a display, a touch screen display, a microphone, a speaker, a RFID reader, barcode reader, biometric scanner, and/or other input/output mechanisms. In embodiments wherein promotional system 100 is embodied as a server or database, aspects of input/output module 508 may be reduced as compared to embodiments where promotional system 100 is implemented as an end-user machine (e.g., consumer device and/or provider device) or other type of device designed for complex user interactions. In some embodiments (like other components discussed herein), input/output module 508 may even be eliminated from promotional system 100. Alternatively, such as in embodiments wherein promotional system 100 is embodied as a server or database, at least some aspects of input/output module 508 may be embodied on an apparatus used by a user that is in communication with promotional system 100, such as for example, internal user device 430 and/or consumer device 420. Input/output module 508 may be in communication with the memory 504, communications module 506, and/or any other component(s), such as via a bus. Although more than one input/output module and/or other component can be included in promotional system 100, only one is shown in FIG. 5 to avoid overcomplicating the drawing (like the other components discussed herein).

In some embodiments, some or all of the functionality otherwise performed by incentive engine 110 may be performed by processor 502. In this regard, the example processes discussed herein can be performed by at least one processor 502 and/or a module of incentive engine 110. For example, non-transitory computer readable storage media can be configured to store firmware, one or more application programs, and/or other software, which include instructions and other computer-readable program code portions that can be executed to control each processor (e.g., processor 502, incentive engine 110 and/or a module of the incentive engine 110) of the promotional system 100 to implement various operations, including the examples shown below. As such, a series of computer-readable program code portions are embodied in one or more computer program products and can be used, with a computing device, server, and/or other programmable apparatus, to produce machine-implemented processes.

FIG. 6 is an example class diagram for providing an incentive on a promotional system 100 according to an example embodiment. The example class diagram may be implemented by the incentive engine 110, for example. Event notification may occur via the notify method of the EventController. For example, Event=MOBILE-APP-LAUNCHED. Context={"deviceId": "12345", "user id": x@xy.com} indicates a mobile application is launched from a device having a respective device id and consumer having the provided user id and/or email address. The incentive engine 110 may return the Event object for MOBILE-APP-LAUNCHED from the EventMap. The incentive engine 110 may then return an active Event Handler from the ListOfEventHandlers. The EventContext may be created using a deviceid, user id, and/or email address, for example. The AuthoritativeSource Enum may indicate which source (device id, user id, or email address) is the authoritative source (e.g., which source will be used to determine if an incentive should be offered).

The incentive engine 110 may then call the "handleEvent" method on the active EventHandler with the EventContext. The EventHandler may then check if the user and/or device has been issued the incentive previously. If qualification constraints are satisfied, the incentive associated with the Event Handler may be returned, and the associated incentive indication provided to the consumer.

Figure 7:
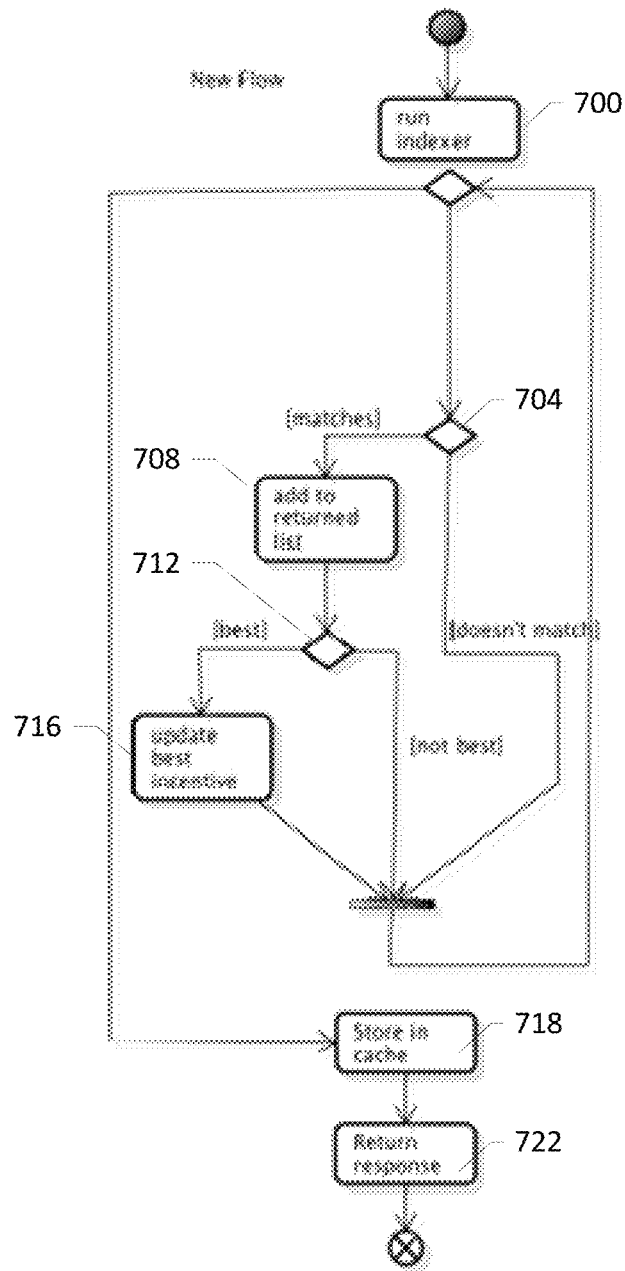
FIGS. 7 and 8 are flowcharts of operations for providing an incentive on a promotional system according to an example embodiment.

FIG. 7 is a flowchart of operations for providing an incentive on a promotional system 100 according to an example embodiment, such as with the incentive engine 110, for example. At operation 700, the incentive engine 110 may run an indexer to identify a set of incentives that should be evaluated. At operation 704, the incentive engine 110 may evaluate the criteria, such as the qualification constraints, associated with each incentive. For any incentive having criteria that is satisfied, the incentive may be added to a list, such as shown at operation 708. As shown by operation 712, the incentive engine 110 may evaluate the list of incentives having satisfied criteria, and identify a best incentive, such as with the incentive ranking module 120. A best incentive may be considered an incentive that is determined to have a highest probability of being redeemed, and/or a highest probability of converting a consumer from a browser to buyer. For example, data collected describing past incentives offered, and corresponding purchase rates and/or ratios may be considered. Various features of the incentives, such as an incentive value and/or expiration, and/or characteristics of the user may be weighted. Incentives, may in some embodiments, may be scored according to a predefined algorithm. A highest score, for example, may be identified as a best incentive. A best incentive may therefore be populated, as shown by operation 716. The indexer may iterate a plurality of incentives, processing operations 704, 708, 712, and 716 described above. The best incentive following each iteration may be stored to cache, as indicated at operation 718. Upon a request for a best incentive, the cached response may be returned, at operation 722. The operations of FIG. 7 may therefore be performed by the incentive engine 110 to efficiently provide an incentive to a consumer during a browsing session in which qualification constraints for several potential incentives may be evaluated.

Figure 8:
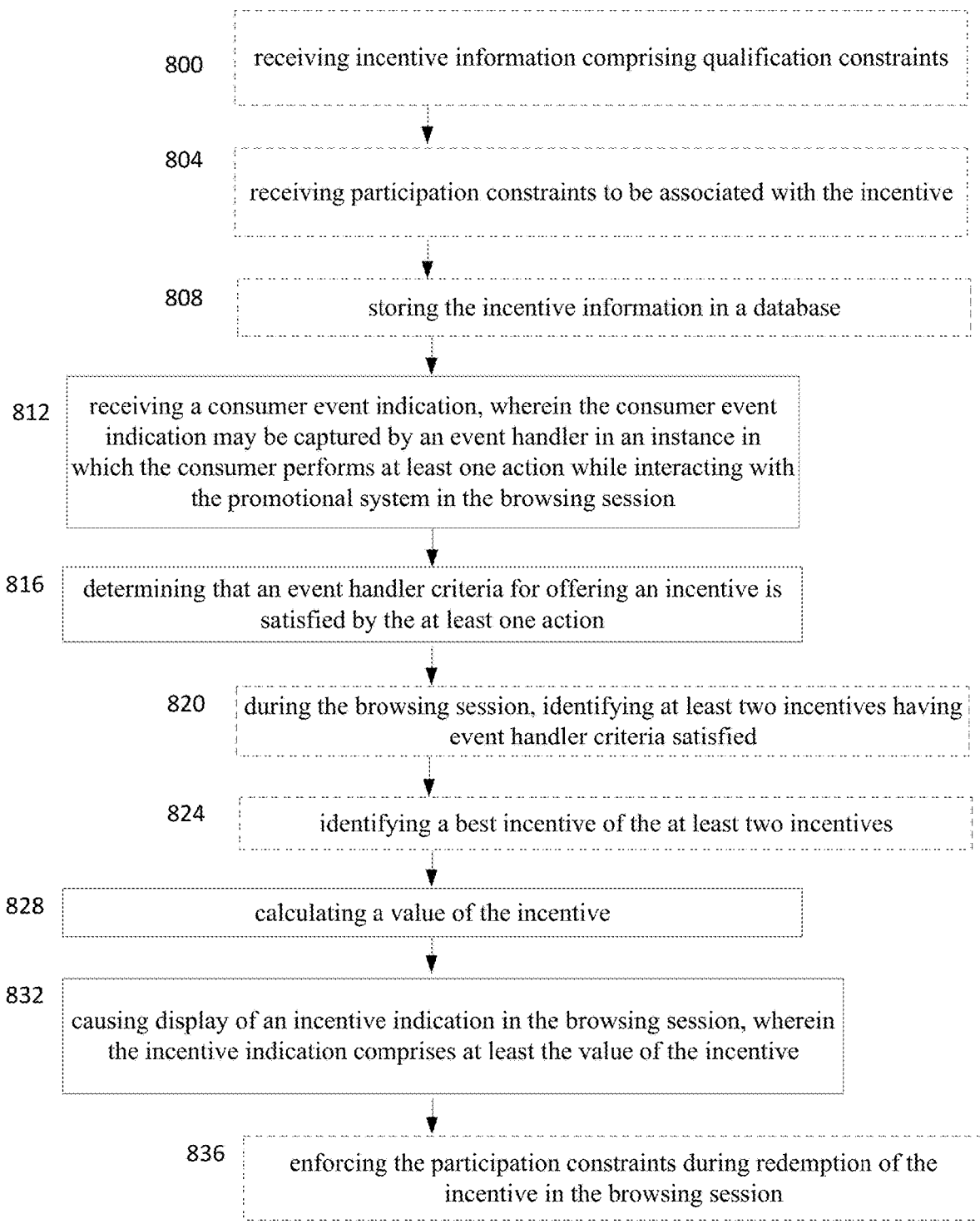

FIG. 8 is a flowchart of operations for providing an incentive on a promotional system 100 according to an example embodiment, such as with the incentive engine 110, for example. As indicated by dashed lines, some operations may be optionally performed. As shown by operation 800, the promotional system 100 may include means, such as incentive creation module 112, constraint module 118, communications module 506, and/or input/output module 508, for receiving incentive information comprising qualification constraints. In some embodiments, the incentive information may further include an incentive value and/or participation constraints. An incentive value may be statically defined during incentive creation (e.g., $20), or it may be dynamically calculated real time, based on various factors relating to the browsing session, consumer, and/or consumer device (incentive calculation is described in more detail with respect to operation 828). Such as described with respect to the displays of FIGS. 2A and 2B, an internal user may use an internal user device 420 to access the promotional system 100 and create, modify, and/or approve an incentive. In this regard, an internal user may create an incentive having a qualification type of real time, meaning that the event handler criteria, or qualification constraints, may be validated real time during a consumer browsing session.

As an example, the internal user may provide qualification constraints requiring that a consumer may be eligible for the incentive after three months have elapsed since a previous purchase. Additionally or alternatively, a consumer may be eligible for an incentive upon accessing the promotion system 100 with a new consumer device. Additionally or alternatively, a consumer may be eligible for an incentive upon newly installing and launching an app. Additionally or alternatively, a consumer may be eligible for an incentive after a newly installed application ("app"), such as an app on a mobile device, has been launched a predetermined number of times, such as 3 times, without a purchase being made by the user of the app. Additionally or alternatively, a consumer may be eligible for an incentive if the user has not made a purchase in the last month. Other examples of qualification constraints are provided herein.

As shown by operation 804, the promotional system 100 may include means, such as incentive creation module 112 and/or constraint module 118, for receiving participation constraints to be associated with the incentive. As described herein, an internal user may configure participation constraints while creating an incentive. For example, participation constraints may require that the incentive may only be redeemed within a predetermined period of time (e.g., a start time and end time is provided) and only during a current browsing session, for example. In some embodiments, qualification constraints may be tied to a consumer device type, platform, service provider, and/or carrier. In some embodiments, an incentive may be provided following a placed order of a minimum amount, or while a consumer views a promotion that costs at least a minimum amount (e.g., has an accepted value of at least the minimum amount). In some embodiments, a qualification constraint may be based on the channel or category of a promotion (e.g., travel, goods, voucher, etc.). A qualification constraint may be based on a quantity or total cost of promotions purchased, and/or a constraint may be offered following the purchase or viewing of a particular promotion. Other examples of participation constraints are provided herein.

As shown by operation 808, the promotional system 100 may include means, such as incentive creation module 112, for storing the incentive information in a database, such as incentive database 404. In this regard, the incentive information may comprise an incentive or campaign name, tags, messaging suppression indicator, discount type, discount amount, display line, and/or any information relating to qualification and/or participation constraints. The incentive information may therefore be provided with an internal user device 420 and/or received by communication modules 506, input/output module 508, for example, processed by incentive creation module 112, and/or processor 502, for example. The incentive information may be stored such that the information is compatible with the classes illustrated in the example class diagram of FIG. 6, for example.

As shown by operation 812, the promotional system 100 may include means, such as incentive indicator module 114, communication module 506, and/or the like, for receiving a consumer event indication, wherein the consumer event indication may be captured by an event handler in an instance in which the consumer performs at least one action while interacting with the promotional system 100 in the browsing session. The consumer event may include a consumer using a mobile application for a first time, logging onto the promotional system 100, viewing a promotion in a browsing session, and/or the like. A consumer event indication may therefore comprise device id, email address, user id and/or the like. As such, the incentive engine 110 may populate available information, such as information relating to the device, consumer, and/or the consumer event, using the IncentivePopularizor object illustrated in the example class diagram of FIG. 6, for example.

As shown by operation 816, the promotional system 100 may include means, such as constraint module 118, incentive indicator module 114, processor 504, and/or the like, for determining that an event handler criteria for offering an incentive is satisfied by the at least one action. As such, various information, such as device id, email, user id, browsing history, previous purchase history, and/or the like, may be made available to the incentive engine 110. As described with respect to FIGS. 6 and 7, and in response to a consumer event indication, the incentive engine 110 may access an EventController to iterate EventHandlers (each associated with an incentive stored to the incentive database 404, for example). As such, given the qualification constraints provided, an evaluateConstraints method may be run, returning true in an instance the criteria is satisfied, and false in an instance the criteria is not satisfied. A returned value of true may indicate the EventHandler criteria (e.g., qualification constraints) are satisfied, and the incentive may be offered to the consumer. A returned value of false may indicate the criteria is not satisfied, and the incentive should not be offered to the consumer. For example, the event handler criteria may comprise at least one of an elapsed amount of time of the browsing session, a number of viewed promotions in the browsing session, and an elapsed amount of time since a previous browsing session.

In some embodiments, although an event handler criteria may be satisfied, there may be scenarios in which the incentive engine 110 may determine the identified incentive should not be offered. Said differently, the incentive indication may be overridden. For example, the promotional system 100 may track, such as in consumer database 400, device ids, email ids, or user ids, and associated received incentive indications. A consumer device 430, therefore, having already received and/or redeemed numerous (e.g., over a threshold number of) incentives, may no longer be eligible to receive subsequent incentive indications for a predefined amount of time. Similarly, a consumer identified by a unique email or user id may be identified as having received so many incentives so as to not be eligible for additional incentives, or at least not presently eligible for additional incentives, such as limited to 1 incentive per month, 2 incentives per category, 5 incentives per year, or the like, for example.

As shown by operation 820, the promotional system 100 may include means, such as constraint module 118, incentive indicator module 114, processor 504, and/or the like, for during the browsing session, identifying at least two incentives having event handler criteria satisfied. As such, the evaluation of constraints may be performed for all or any number of incentives stored to incentive database 404, and in some embodiments, more than one incentive may be identified as having event handler criteria satisfied.

As shown by operation 824, the promotional system 100 may include means, such as incentive ranking module 120, processor 504, and/or the like, for identifying a best incentive of the at least two incentives. As described above with respect to FIG. 7, a best incentive may be identified as an incentive most likely to convert a browsing consumer to a buyer. The ranking of eligible incentives and identification of a best incentive may prevent multiple incentive indications from being presented to a consumer at once and to only present the incentive that is the most likely to most likely to convert a browsing consumer to a buyer.

As shown by operation 828, the promotional system 100 may include means, such as value calculation module 116, processor 504, and/or the like, for calculating a value of the incentive. For example, in embodiments in which the qualification constraints are evaluated real time, the value of the incentive may also be calculated real time, and may be dependent on any factors available to the promotion system 100. For example, an incentive value may be higher for a consumer known to have purchased a large number of promotions in the past, and lower for a consumer who has not yet purchased a promotion, or the reverse. In some embodiments, the incentive value may be calculated based on at least one of an accepted value or promotional value of the promotion. In some embodiments, the incentive value may be fixed, and retrieved from incentive database 404, for example. In some embodiments, the incentive value may be a percentage minimum of the promotion value or the accepted value of the promotion without the incentive. In some embodiments, the incentive value may be a minimum amount plus a percentage of the promotional value or the accepted value without the incentive. In some embodiments, the incentive value may be a percentage of the promotional value or the accepted value of the promotion without the incentive up to a maximum amount. In some embodiments, the incentive value may be weighted based upon one or more factors, such as how long since the user last purchased a promotion, how frequently a user purchases promotions, and/or the accepted values of the promotions purchased by the user. For example, if a user has not purchased a promotion in only the last month, an incentive value may be weighted 0.5; if the user has not purchased a promotion in the last three months, an incentive value may be weighted 1.0; and if a user has not purchased a promotion in the last year, an incentive value may be weighted 2.0, such as, for an incentive value of $10, the three scenarios above would result in incentives of $5, $10, and $20, respectively.

As shown by operation 832, the promotional system 100 may include means, such as incentive indicator module 114, communications module 506, input/output module 508, and/or the like, for causing display of an incentive indication in the browsing session, wherein the incentive indication comprises at least the value of the incentive. As described herein, as in illustrated in example displays, the incentive indication may be displayed to a consumer on a consumer device 420, for example. The incentive indication may be displayed to encourage the consumer to purchase a promotion, and/or to convert browsing consumers to buyers. A consumer who browses the promotional system 100, may therefore view an incentive indication, and may be motivated to purchase a promotion based on the discount shown in the incentive indication. The consumer may not have otherwise purchased the promotion, and therefore the incentive may help convert browsing consumers to buyers. In some embodiments, the incentive indication may comprise an offer to purchase a promotion via the promotional system, wherein the promotion provides a service or product at a first discount and the value of the incentive is a second discount that may be applied to a purchase of the promotion. In some embodiments, the incentive indication may comprise participation constraints, so that a consumer may understand the terms of redeeming the incentive.

As shown by operation 836, the promotional system 100 may include means, such as constraint module 114, communications module 506, input/output module 508, and/or the like, for enforcing the participation constraints during redemption of the incentive in the browsing session. As described herein with reference to example displays, the incentive may be applied to a purchase of a promotion at checkout. Therefore, the incentive engine 110 may evaluate the participation constraints and only apply the incentive in scenarios in which the participation constraints are satisfied. For example, the participation constraints may require the incentive only be applied to a purchase over a threshold amount. The constraint module 114 may therefore ensure the incentive is not applied to a purchase that doesn't meet the threshold amount.

In some embodiments, following termination of a browsing session, the incentive engine 110 may utilize the Depopulator of the example class diagram of FIG. 6, so as to discontinue evaluation of event handler criteria for the particular device, consumer, event, and/or the like.

Figure 9:
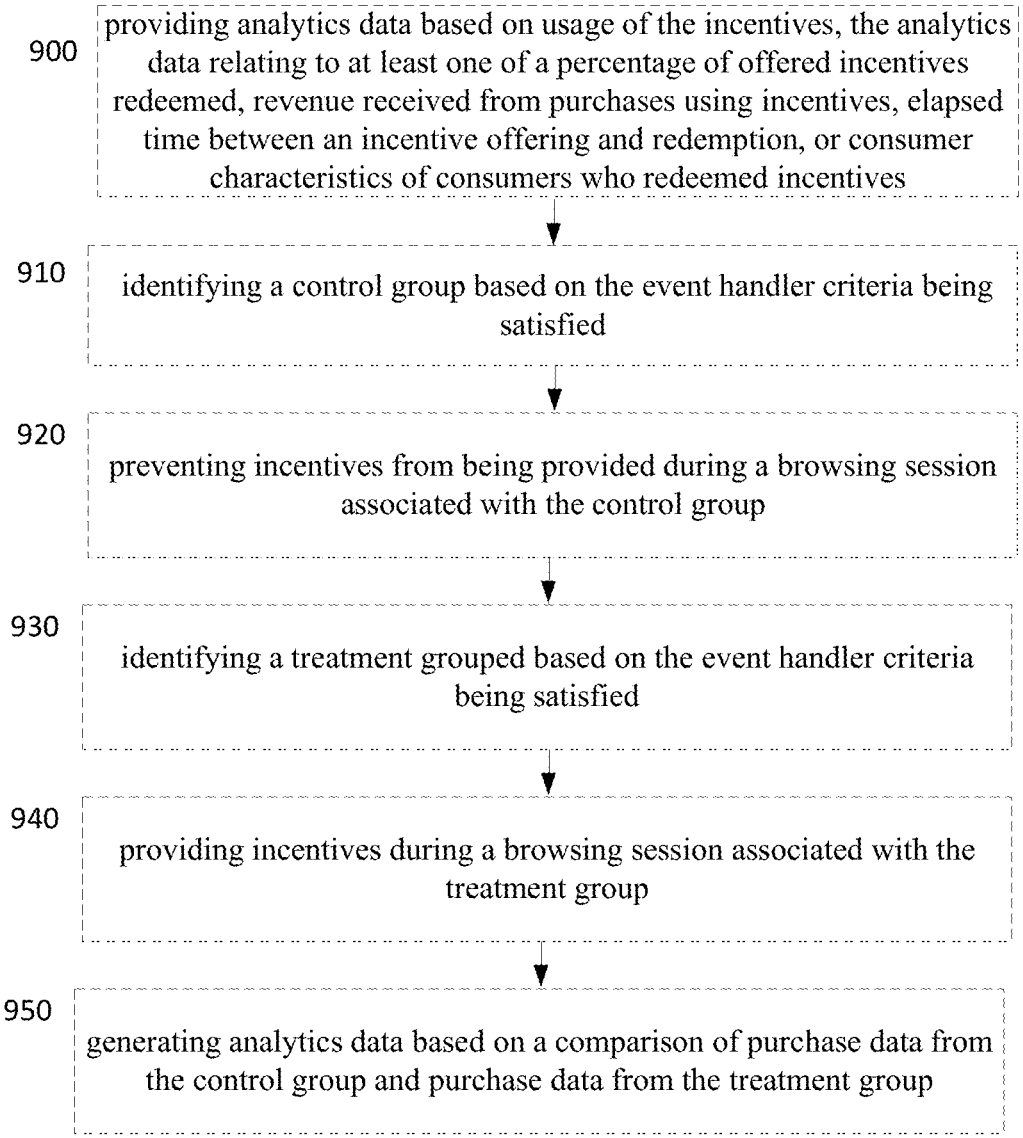
FIG. 9 is a flowchart of operations for providing analytics data according to an example embodiment.

FIG. 9 is a flowchart of operations for providing analytics data according to an example embodiment, such as with incentive engine 110 and/or incentive analytics module 122. As indicated by dashed lines, some operations may be optionally performed. As shown by operation 900, the incentive engine 110 may include means, such as the incentive analytics module 122, for providing analytics data based on usage of the incentives, the analytics data relating to at least one of a percentage of offered incentives redeemed, revenue received from purchases using incentives, elapsed time between an incentive offering and redemption, or consumer characteristics of consumers who redeemed incentives. In this regard, the analytics module 122 may provide data to an internal user, such as on an internal user device 430, describing the usage of the incentives. The analytics data may help the internal user determine the effectiveness of the incentives. That is, the analytics data may help the internal user estimate or calculate the number of browsing consumers the incentives effectively converted to buyers. The process of providing analytics data is discussed in more detail with respect to operations 910-950 below.

As shown by operation 910, the incentive engine 110 may include means, such as the incentive analytics module 122, for identifying a control group based on the event handler criteria being satisfied. As such, in some example embodiments, although event handler criteria is satisfied, indicating a consumer is eligible for an incentive during a browsing session, the incentive engine 110 may assign the consumer and/or browsing session to a control group.

As shown by operation 920, the incentive engine 110 may include means, such as the incentive analytics module 122, for preventing incentives from being provided during a browsing session associated with the control group. The incentive engine may therefore override an incentive indication to a consumer or browsing session belonging to the control group.

As shown by operation 930, the incentive engine 110 may include means, such as the incentive analytics module 122, for identifying a treatment grouped based on the event handler criteria being satisfied. Similar to identifying the control group, the incentive engine 110 may identify other consumers and/or browsing sessions in which event handler criteria is satisfied. Members of the control group and members of the treatment groups may be identified at random, other than both having satisfied event handler criteria and therefore being eligible for an incentive.

As shown by operation 940, the incentive engine 110 may include means, such as the incentive analytics module 122, for providing incentives during a browsing session associated with the treatment group. The incentive engine 110 may therefore be configured to provide incentives to members of the treatment group, as described herein. The prevention applied to the control group is therefore not applied to the treatment group.

As shown by operation 950, the incentive engine 110 may include means, such as the incentive analytics module 122, for generating analytics data based on a comparison of purchase data from the control group and purchase data from the treatment group. By monitoring the purchase data and/or incentive redemption rates, internal users of the promotional system 100 may understand the effectiveness of various incentives, and determine what types of incentives may convert more browsing consumers to buyers in the future.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus circuitry to produce a machine, such that the computer, processor, or other programmable circuitry that executes the code on the machine creates the means for implementing various functions, including those described herein.

It is also noted that all or some of the information presented by the example displays discussed herein can be based on data that is received, generated and/or maintained by one or more components of promotional system 100. In some embodiments, one or more external systems (such as a remote cloud computing and/or data storage system) may also be leveraged to provide at least some of the functionality discussed herein.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 502, and/or incentive engine 110 discussed herein, to produce a machine, such that the computer program product includes the instructions which execute on the computer or other programmable data processing apparatus create a means for implementing the functions specified in the flowchart block or blocks.

These computer program instructions may also be stored in a computer-readable storage medium (e.g., memory 504) that can direct a computer or other programmable data processing apparatus to function in a particular manner, such that the instructions stored in the computer-readable storage medium produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for providing an incentive on a promotional system during a current browsing session, the apparatus comprising:
at least one processor;
and at least one memory including computer program code, the at least one memory and the computer program code configured to, with the processor, cause the apparatus to at least,
provide a computer program routine to a device, the computer program routine configured to generate consumer event indications;
access a promotion via a promotional system, the promotion comprising at least a service or product offered by a provider, an accepted value for which the promotion is offered for purchase via the promotional system, and a promotional value for which the promotion is redeemable at the provider for the service or product;
cause an impression to be rendered in a web interface on the device during the current browsing session, wherein the impression identifies the promotion and indicates at least the service or product offered by a provider, the accepted value for which the promotion is offered for purchase, and the promotional value for which the promotion is redeemable at a provider;
receive a plurality of consumer event indications from the computer program routine, each consumer event indication a result of a consumer performing at least one monitored action while interacting with the promotional system during the rendering of the impression in the web interface during the current browsing session, wherein each consumer event indication is captured by an event handler in an instance in which the consumer performs the at least one action;
iteratively calculate, during the rendering of the impression in the web interface during the current browsing session, at least one of (i) an elapsed amount of time spent browsing the promotion or (ii) an elapsed amount of time of the current browsing session, based at least in part on the received plurality of consumer event indications;
further calculate an elapsed amount of time between the current browsing session and a previous browsing session by a user associated with the current browsing session;
determine, with a processor remote from the device and during the rendering of the impression in the web interface during the current browsing session, that an event handler criteria for offering the incentive is satisfied based at least in part on the calculated elapsed amount of time between the current browsing session and the previous browsing session and a determination that one or more qualification constraints are satisfied based on at least one of (a) the elapsed amount of time spent browsing the promotion, or (b) the elapsed amount of time of the current browsing session, wherein each qualification constraint is associated with a respective incentive stored in an incentive database;
authorize the incentive during the rendering of the impression in the web interface during the current browsing session based on the determination that the event handler criteria for offering the incentive is satisfied;
in response to the authorization of the incentive, access a base value of the incentive stored in the incentive database, wherein the base value of the incentive is a percentage of the promotional value;
accessing a weight to be applied to the value of the incentive by determining an elapsed amount of time since the user purchased a promotion via the promotional system;
determine an adjusted value of the incentive by adjusting the base value of the incentive by the weight; and
in response to the authorization of the incentive, cause the web interface in which the impression is rendered during the current browsing session to be modified such that (a) an incentive indication is displayed with the impression, wherein the incentive indication comprises at least the adjusted value of the incentive, wherein the promotion provides the service or product at a first discount according to the accepted value for which the promotion is offered for purchase and the promotional value for which the promotion is redeemable at a provider, and wherein the adjusted value of the incentive is a second discount to be applied to the accepted value for which the promotion is offered for purchase, and (b) the web interface displays in a first impression area, details relating to the promotion, including the accepted value representative of the first discount, and in a second impression area, the incentive indicative of the second discount, wherein the web interface enables purchase of the promotion via at least an interaction with a displayed component during the current browsing session at a price that reflects the first discount and the second discount.

2. The apparatus of claim 1, wherein the event handler criteria further comprises a number of viewed promotions in the current browsing session.

3. The apparatus of claim 1, wherein the at least one memory and computer program code are further configured to cause the apparatus to at least:
receive participation constraints to be associated with the incentive, wherein the incentive indication comprises the participation constraints; and
enforce the participation constraints during redemption of the incentive in the current browsing session.

4. The apparatus of claim 1, wherein the incentive is redeemable only for a predetermined amount of time and only during the current browsing session.

5. The apparatus of claim 1, wherein the at least one memory and computer program code are further configured to cause the apparatus to at least:

provide analytics data based on usage of a plurality of incentives, the analytics data relating to a percentage of offered incentives redeemed.

6. The apparatus of claim 1, wherein the at least one memory and computer program code are further configured to cause the apparatus to at least:
provide analytics data based on usage of a plurality of incentives, the analytics data relating to a revenue received from purchases using incentives.

7. The apparatus of claim 1, wherein the at least one memory and computer program code are further configured to cause the apparatus to at least:
identify a control group based on the event handler criteria being satisfied;
prevent incentives from being provided during a browsing session associated with the control group;
identify a treatment grouped based on the event handler criteria being satisfied;
provide incentives during a browsing session associated with the treatment group; and
generate analytics data based on a comparison of purchase data from the control group and purchase data from the treatment group.

8. A method for providing an incentive via a promotional system during a current browsing session, the method comprising:
providing a computer program routine to a device, the computer program routine configured to generate consumer event indications;
accessing a promotion via a promotional system, the promotion comprising at least a service or product offered by a provider, an accepted value for which the promotion is offered for purchase via the promotional system, and a promotional value, for which the promotion is redeemable at the provider for the service or product;
causing an impression to be rendered in a web interface on the device during the current browsing session, wherein the impression identifies the promotion and indicates at least the service or product offered by a provider, the accepted value for which the promotion is offered for purchase, and the promotional value for which the promotion is redeemable at a provider;
receiving a plurality of consumer event indications from the computer program routine, each consumer event indication a result of a consumer performing at least one monitored action while interacting with the promotional system during the rendering of the impression in the web interface during the current browsing session, wherein each consumer event indication is captured by an event handler in an instance in which the consumer performs the at least one action;
iteratively calculating, during the rendering of the impression in the web interface during the current browsing session, at least one of (i) an elapsed amount of time spent browsing the promotion or (ii) an elapsed amount of time of the current browsing session, based at least in part on the received plurality of consumer event indications;
further calculating an elapsed amount of time between the current browsing session and a previous browsing session by a user associated with the current browsing session;
determining, with a processor remote from the device and during the rendering of the impression in the web interface during the current browsing session, that an event handler criteria for offering the incentive is satisfied based at least in part on the calculated elapsed amount of time between the current browsing session and the previous browsing session and a determination that one or more qualification constraints are satisfied based on at least one of (a) the elapsed amount of time spent browsing the promotion, or (b) the elapsed amount of time of the current browsing session, wherein each qualification constraint is associated with a respective incentive stored in an incentive database;
authorizing the incentive during the rendering of the impression in the web interface during the current browsing session based on the determination that the event handler criteria for offering the incentive is satisfied;
in response to the authorization of the incentive, accessing a base value of the incentive stored in the incentive database, wherein the base value of the incentive is a percentage of the promotional value;
accessing a weight to be applied to the value of the incentive by determining an elapsed amount of time since the user purchased a promotion via the promotional system;
determining an adjusted value of the incentive by adjusting, the base value of the incentive by the weight; and
in response to the authorization of the incentive, causing the web interface in which the impression is rendered during the current browsing session to be modified such that (a) an incentive indication is displayed with the impression, wherein the incentive indication comprises at least the adjusted value of the incentive, wherein the promotion provides the service or product at a first discount according to the accepted value for which the promotion is offered for purchase and the promotional value for which the promotion is redeemable at a provider, and wherein the adjusted value of the incentive is a second discount to be applied to the accepted value for which the promotion is offered for purchase, and (b) the web interface displays in a first impression area, details relating to the promotion, including the accepted value representative of the first discount, and in a second impression area, the incentive indicative of the second discount, wherein the web interface enables purchase of the promotion via at least an interaction with a displayed component during the current browsing session at a price that reflects the first discount and the second discount.

9. The method of claim 8, wherein the event handler criteria further comprises a number of viewed promotions in the current browsing session.

10. The method of claim 8, further comprising:
receiving participation constraints to be associated with the incentive, wherein the incentive indication comprises the participation constraints; and
enforcing the participation constraints during redemption of the incentive in the current browsing session.

11. The method of claim 8, wherein the incentive is redeemable only for a predetermined amount of time and only during the current browsing session.

12. The method of claim 8, further comprising:
providing analytics data based on usage of a plurality of incentives, the analytics data relating to a percentage of offered incentives redeemed.

13. The method of claim 8, further comprising:
providing analytics data based on usage of a plurality of incentives, the analytics data relating to a revenue received from purchases using incentives.

14. The method of claim 8, further comprising:
identifying a control group based on the event handler criteria being satisfied;
preventing incentives from being provided during a browsing session associated with the control group;
identifying a treatment grouped based on the event handler criteria being satisfied;
providing incentives during a browsing session associated with the treatment group; and
generating analytics data based on a comparison of purchase data from the control group and purchase data from the treatment group.

15. A non-transitory computer program product for providing an incentive on a promotional system during a current browsing session, the non-transitory computer program product comprising at least one non-transitory computer-readable storage medium having computer-executable program code instructions stored therein, the computer-executable program code instructions comprising program code instructions to:
provide a computer program routine to a device, the computer program routine configured to generate consumer event indications;
access a promotion via a promotional system, the promotion comprising at least a service or product offered by a provider, an accepted value for which the promotion is offered for purchase via the promotional system, and a promotional value liar which the promotion is redeemable at the provider for the service or product;
cause an impression to be rendered in a web interface on the device during the current browsing session, wherein the impression identifies the promotion and indicates at least the service or product offered by a provider, the accepted value for which the promotion is offered for purchase, and the promotional value for which the promotion is redeemable at a provider;
receive a plurality of consumer event indications from the computer program routine, each consumer event indication a result of a consumer performing at least one monitored action while interacting with the promotional system during the rendering of the impression in the web interface during the current browsing session, wherein each consumer event indication is captured by an event handler in an instance in which the consumer performs the at least one action;
iteratively calculate, during the rendering of the impression in the web interface during the current browsing session, at least one of (i) an elapsed amount of time spent browsing the promotion or (ii) an elapsed amount of time of the current browsing session, based at least in part on the received plurality of consumer event indications;
further calculate an elapsed amount of time between the current browsing session and a previous browsing session by a user associated with the current browsing session;
determine, with a processor remote from the device and during the rendering of the impression in the web interface during the current browsing session, that an event handler criteria for offering the incentive is satisfied based at least in part on the calculated elapsed amount of time between the current browsing session and the previous browsing session and a determination that one or more qualification constraints are satisfied based on at least one of (a) the elapsed amount of time spent browsing the promotion, or (b) the elapsed amount of time of the current browsing session, wherein each qualification constraint is associated with a respective incentive stored in an incentive database;
authorize the incentive during, the rendering of the impression in the web interface during the current browsing session based on the determination that the event handler criteria for offering the incentive is satisfied;
in response to the authorization of the incentive, access a base value of the incentive stored in the incentive database, wherein the base value of the incentive is a percentage of the promotional value;
access a weight to be applied to the value of, the incentive by determining an elapsed amount of time since the user purchased a promotion via the promotional system;
determine an adjusted value of the incentive by adjusting the base value of the incentive by the weight; and
in response to the authorization of the incentive, cause the web interface in which the impression is rendered during the current browsing session to be modified such that (a) an incentive indication is displayed with the impression, wherein the incentive indication comprises at least the adjusted value of the incentive, wherein the promotion provides the service or product at a first discount according to the accepted value for which the promotion is offered for purchase and the promotional value for which the promotion is redeemable at a provider, and wherein the adjusted value of the incentive is a second discount to be applied to the accepted value for which the promotion is offered for purchase, and (b) the web interface displays in a first impression area, details relating to the promotion, including the accepted value representative of the first discount, and in a second impression area, the incentive indicative of the second discount, Wherein the web interface enables purchase of the promotion via at least an interaction with a displayed component during the current browsing session at a price that reflects the first discount and the second discount.

16. The non-transitory computer program product of claim 15, wherein the event handler criteria further comprises a number of viewed promotions in the current browsing session.

17. The non-transitory computer program product of claim 15, wherein the computer-executable program code instructions further comprise program code instructions to:
receive participation constraints to be associated with the incentive, wherein the incentive indication comprises the participation constraints; and
enforce the participation constraints during redemption of the incentive in the current browsing session.

* * * * *